Oct. 12, 1965 H. KARLBY ETAL 3,210,997
TURBINE FLOWMETER
Original Filed Feb. 27, 1958 8 Sheets-Sheet 1

INVENTORS
HENNING KARLBY
WINSTON F. Z. LEE

BY
ATTORNEYS

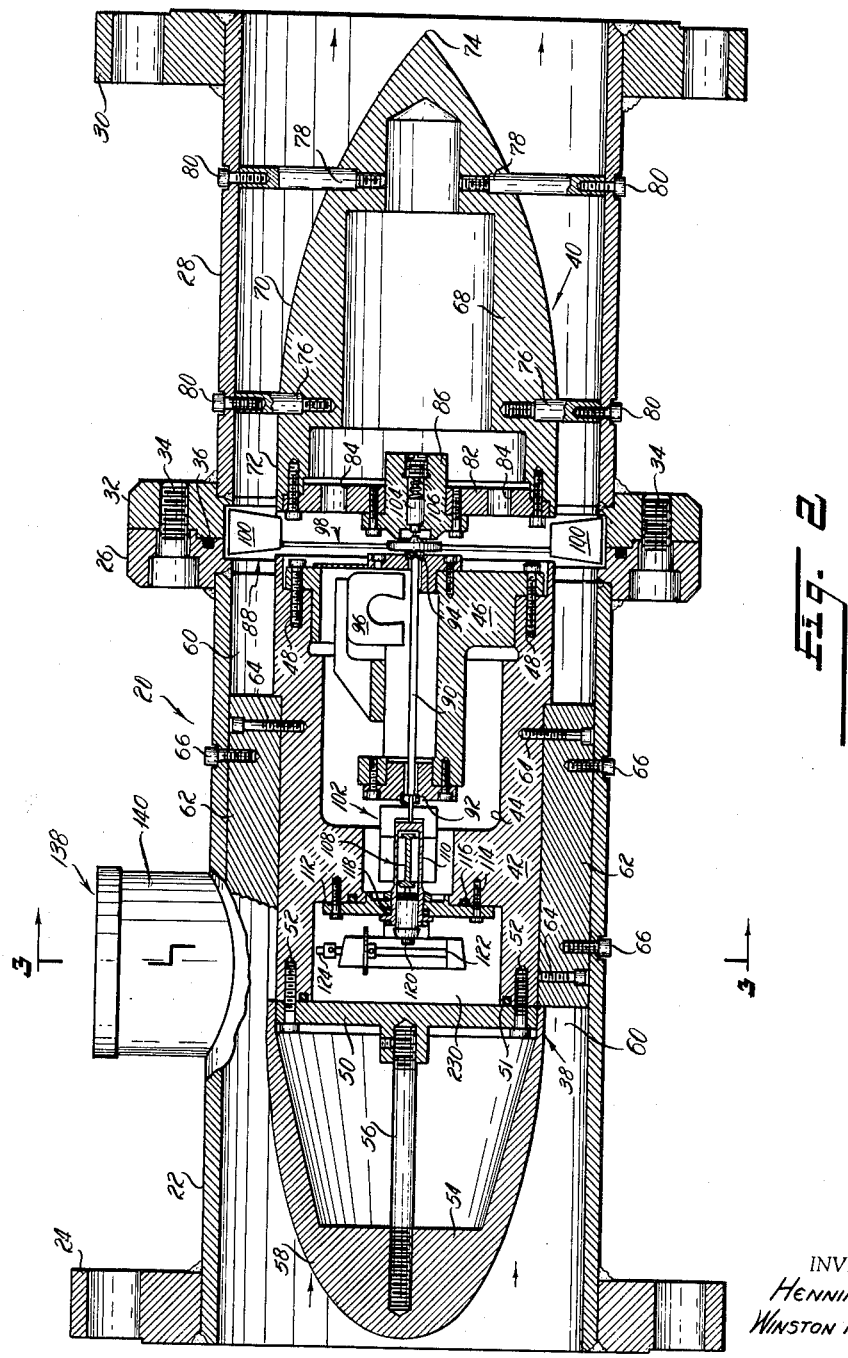

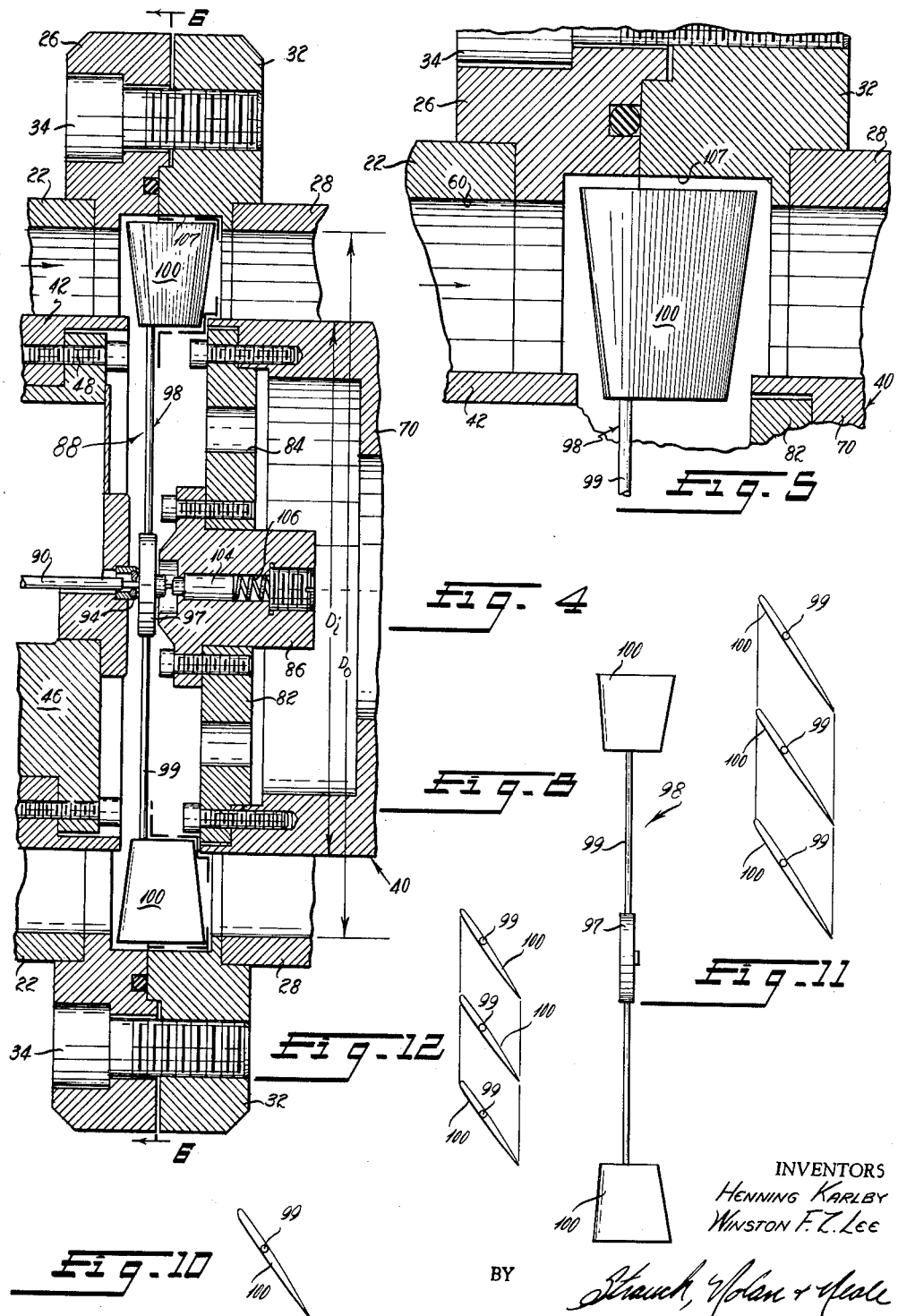

Oct. 12, 1965 H. KARLBY ETAL 3,210,997
TURBINE FLOWMETER

Original Filed Feb. 27, 1958 8 Sheets-Sheet 4

INVENTORS
HENNING KARLBY
WINSTON F. Z. LEE

BY Strauch, Nolan & Neale

ATTORNEYS

Oct. 12, 1965 H. KARLBY ETAL 3,210,997
TURBINE FLOWMETER
Original Filed Feb. 27, 1958 8 Sheets-Sheet 5

INVENTORS
HENNING KARLBY
WINSTON F. Z. LEE

BY
ATTORNEYS

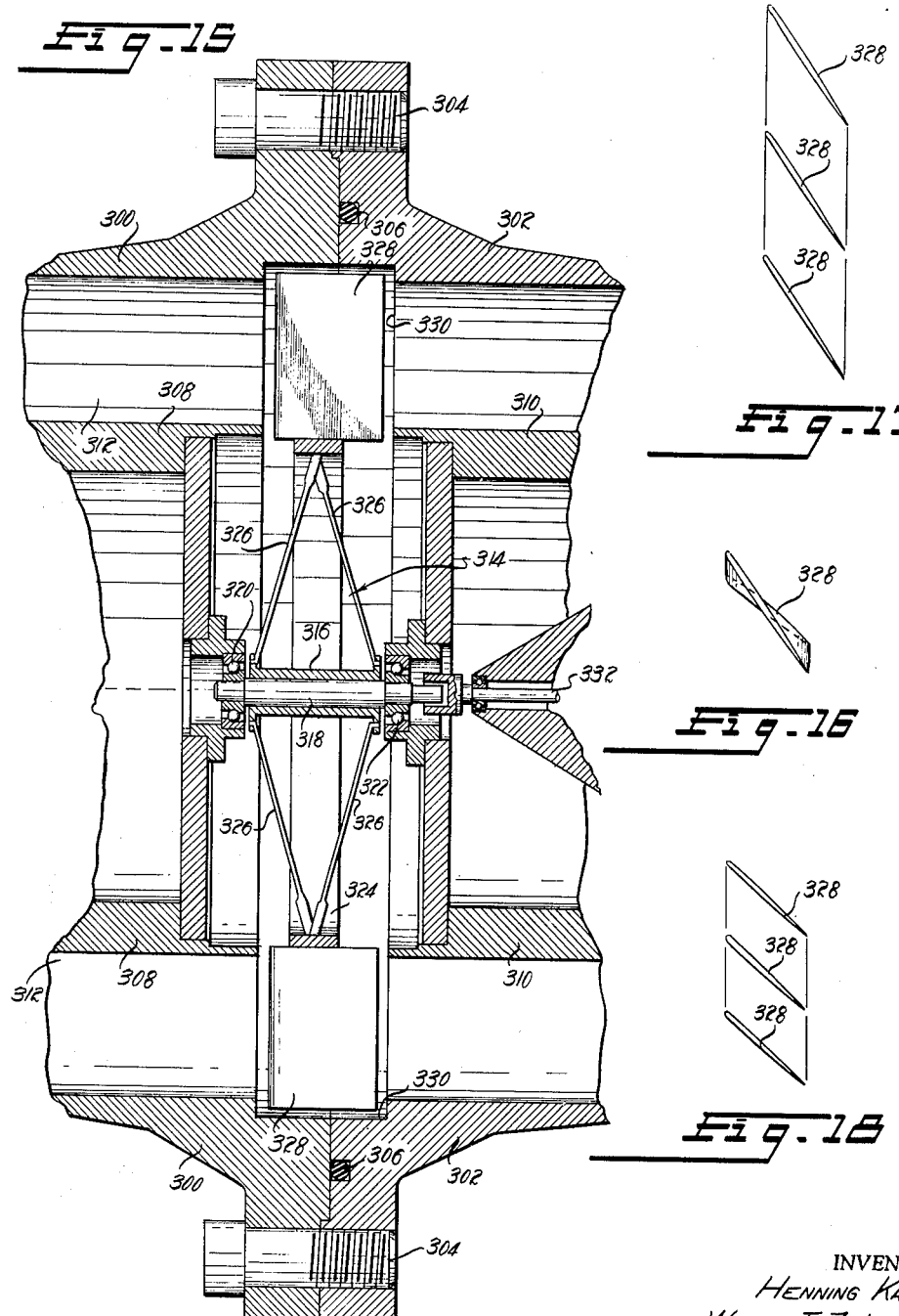

INVENTORS
HENNING KARLBY
WINSTON F. Z. LEE
BY
Strauch, Nolan + Neale ATTORNEYS

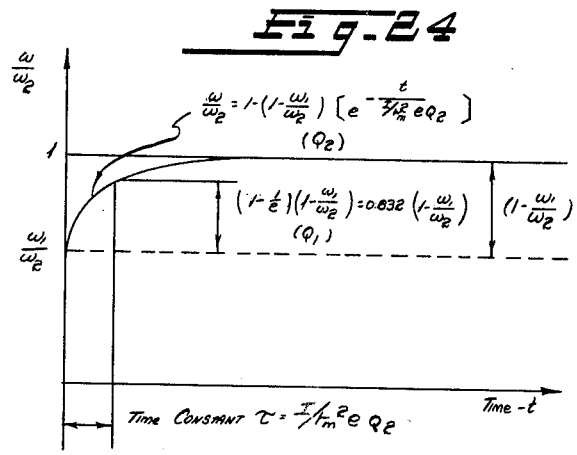
Fig. 24
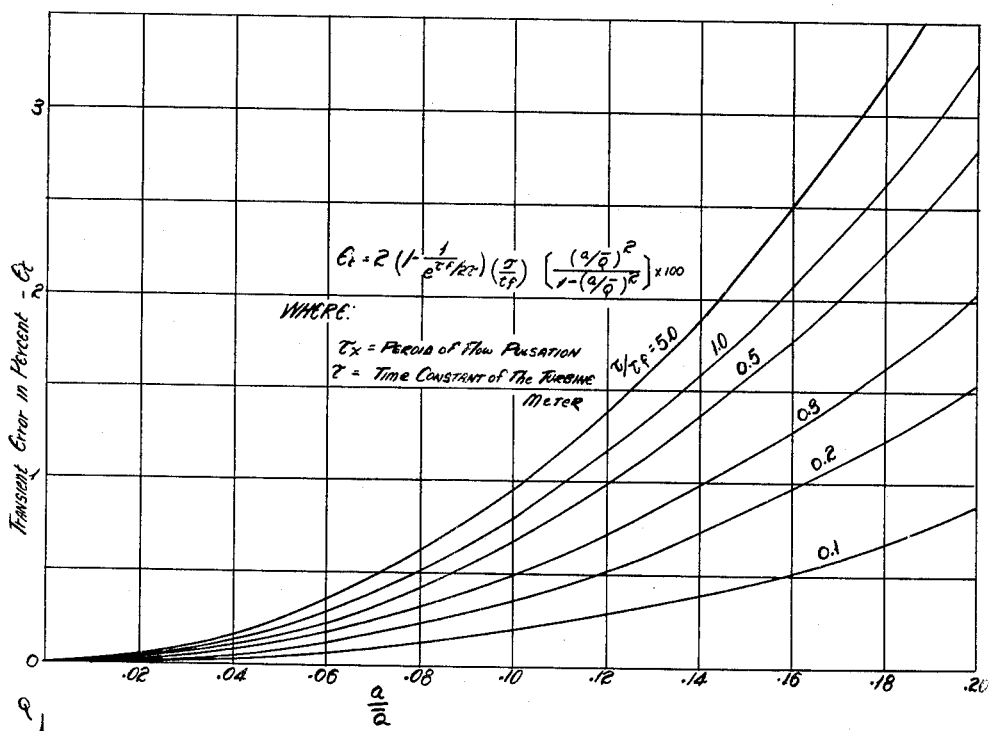
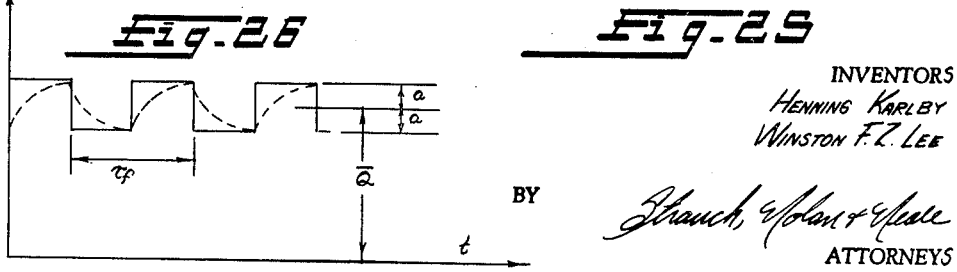
Fig. 26    Fig. 25
INVENTORS
HENNING KARLBY
WINSTON F. Z. LEE
BY
ATTORNEYS

United States Patent Office 3,210,997
Patented Oct. 12, 1965

3,210,997
TURBINE FLOWMETER
Henning Karlby and Winston F. Z. Lee, Pittsburgh, Pa., assignors to Rockwell Manufacturing Company, Pittsburgh, Pa., a corporation of Pennsylvania
Original application Feb. 27, 1958, Ser. No. 717,863. Divided and this application Feb. 13, 1962, Ser. No. 172,948
12 Claims. (Cl. 73—231)

This is a division of our copending application Serial Number 717,863 filed February 27, 1958 which is a continuation-in-part of our copending application Serial Number 634,662 filed January 17, 1957.

The present invention relates to improvements in fluid meters and more particularly to the provision of a high capacity fluid meter operable for the direct measurement of both steady and fluctuating flow of fluids over a wide viscosity range with high accuracy, large flow ratio, small head loss and at all practical line pressures.

At present, three different basic types of meters are in wide usage for the measurement of fluid flow: reciprocating and rotary positive displacement meters and orifice meters. Reciprocating positive displacement type meters are accurate and suited for fluctuating flow, but are rather bulky, expensive and good for low pressure only. This type of meter is thus limited to use in measuring low rates of flow. Rotary positive displacement type meters have been accepted as accurate instruments for measuring medium quantities of fluid at low or moderate pressure. They become intolerably bulky and expensive when designed for large rates of flow or high pressure. The orifice meter has been long recognized as the simplest form of measuring apparatus for medium and large quantities of fluid at all practical line pressures. It has the inherent disadvantage of low flow ratio due to the fact that the rate of flow is proportional to the square root of the measured quantities. It is not a measuring device of high accuracy and is unfitted for metering fluctuating flow. To obtain the total flow, its chart must be integrated with an expensive integrator, a time consuming operation.

From the above considerations, it is apparent that heretofore, there have been no satisfactory instruments in general use for the direct measurement of both steady and fluctuating flow of medium and large rates at moderate and high pressures with high accuracy, large flow ratio, and small head loss. The present invention contemplates the provision of a turbine meter of improved construction which satisfies these requirements, and has the ability to drive a mechanical register without an external power source.

Turbine meters, as such, have been known for many years but none, in so far as we are presently aware, have been of a design which is effective to provide an accurate direct measurement of both steady and fluctuating flow at medium and large rate and moderate and high pressures over a large flow rate range with small head loss as is essential in any commercially acceptable turbine meter. Examples of patented prior art turbine meters are disclosed in United States Patent No. 697,492 issued April 15, 1902 to W. H. Kelly et al. for Electromagnetic Water Meter; No. 1,463,865 issed August 7, 1923 to R. S. Blair for Fluid Meter; 2,593,285 issued April 15, 1952 to C. H. Fay et al. for Oil Well Flow Meter, and No. 2,713,261 issued July 19, 1955 to G. J. Butterworth et al. for Self-Contained Flow Meters.

As will become fully apparent presently, the design criteria and operating requirements of a turbine meter are vastly different from those of a conventional turbine. The purpose of a conventional power turbine is to convert the kinetic energy of fluid flow into shaft work. It is designed for maximum power extraction with reasonably high efficiency. The turbine used for the measurement of fluid flow is, however, one of zero output. In a turbine meter, mechanical friction losses and flow losses are the only sources of power consumption. A commercially acceptable turbine meter must be designed to provide a linear relationship between the turbine speed and the rate of flow, high driving torque for a given slip of the rotor, low weight and low moment of inertia of rotor assembly, small head loss, large flow ratio, and independence of viscosity effect.

With the foregoing general considerations in view, the basic objects of this invention are to provide an improved turbine meter which has:

(a) Linear proportionality between turbine speed and rate of flow within its operating range;

(b) High driving torque for a given slip of the rotor;

(c) High flow ratio ($R_f = Q_{max.}/Q_{min.}$, where $Q_{max.}$ is the rated capacity of the meter and $Q_{min.}$ is the minimum rate of flow corresponding to certain allowable percentage of error);

(d) Low effective weight of the rotating parts of the turbine to minimize mechanical friction to insure high accuracy especially at low flow rates, low moment of inertia of the rotating parts to provide quick response to fluctuating flow;

(e) A single meter constant for fluids of different viscosities or for a wide variation of viscosity due to temperature change;

(f) Low head loss across the meter;

(g) No pulsation and virtually noiseless;

(h) Unrestricted flow passage through the turbine meter, thus adaptable to handling solids in suspension; and (i) Simplicity of construction and low cost.

These and subsidiary objects of the present invention will become more fully apparent by reference to the appended claims and as the following detailed description proceeds in reference to the accompanying drawings wherein:

FIGURE 2 is a sectioinal view of the meter in FIGURE 1 taken substantially along the line 2—2 of FIGURE 1;

FIGURE 4 is an enlarged fragmentary sectional view illustrating the turbine rotor of the meter of FIGURE 1;

FIGURE 5 is an enlarged fragmentary sectional view illustrating the relation of the turbine rotor blades to the annular flow passage in the meter of FIGURE 1;

FIGURE 6 is a sectional view taken substantially along the line 6—6 of FIGURE 4;

FIGURE 10 is a top plan view of the blade of FIGURE 9;

FIGURE 11 is a development of a fragmentary cylindrical section of the tips of the blades of the rotor of FIGURE 8;

FIGURE 12 is a development of a fragmentary cylindrical section at the roots of the blades of the rotor of FIGURE 8;

FIGURE 15 is a view similar to FIGURE 4 of an enlarged and modified form of the meter of FIGURE 1 primarily adapted for use in metering liquids;

FIGURE 16 is a top plan view of one of the blades of the rotor of FIGURE 15 illustrating the twisted blade construction;

FIGURE 17 is a development of a fragmentary cylindrical section at the tips of the blades of the rotor of FIGURE 15;

FIGURE 18 is a development of a fragmentary cylindrical section at the roots of the blades of the rotor of FIGURE 15;

FIGURE 24 is a graph illustrating the transient response of the turbine meter to an instantaneous change in flow rate; and FIGURES 25 and 26 are a graph showing the transient error of a turbine meter as a function of the nature of the pulsating flow.

This disclosure of the present invention will proceed with a detailed description of the structural arrangement of the disclosed embodiment of the present invention, a mathematical analysis of the operation of turbine meters and a detailed explanation of the significance of each of the several aspects of the present invention.

Figure 1:
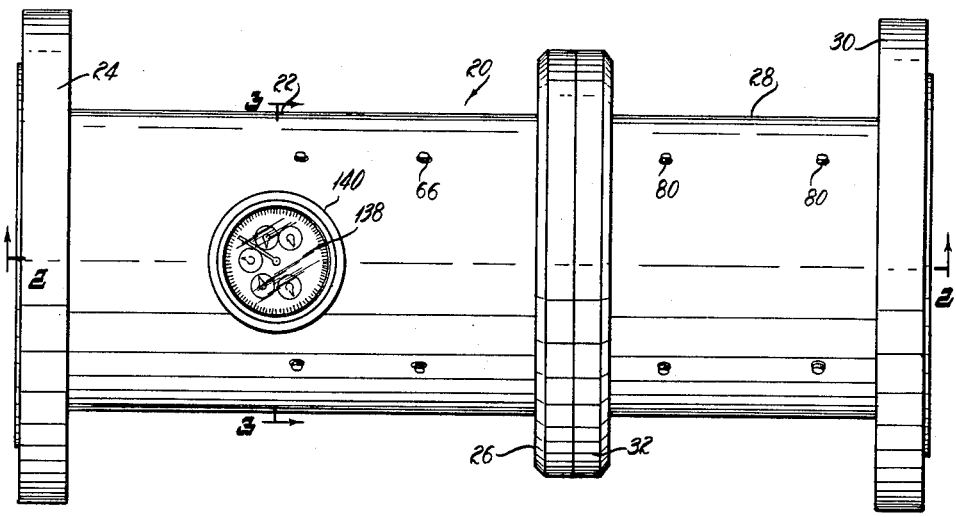
FIGURE 1 is a top plan view of a turbine fluid meter embodying the principles of the present invention, and primarily adapted for metering gases.
Figure 3:
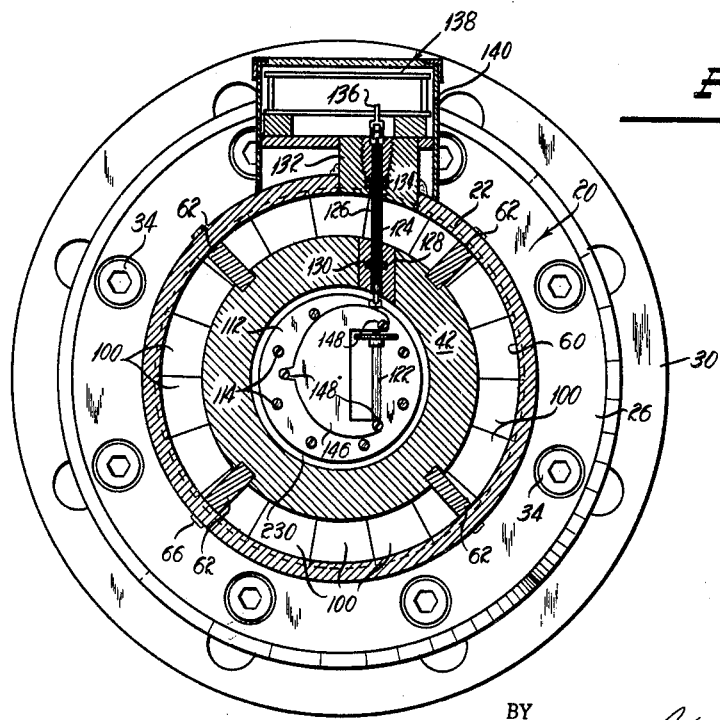
FIGURE 3 is a sectional view taken substantially along the line 3—3 of FIGURE 2.
Figure 8:
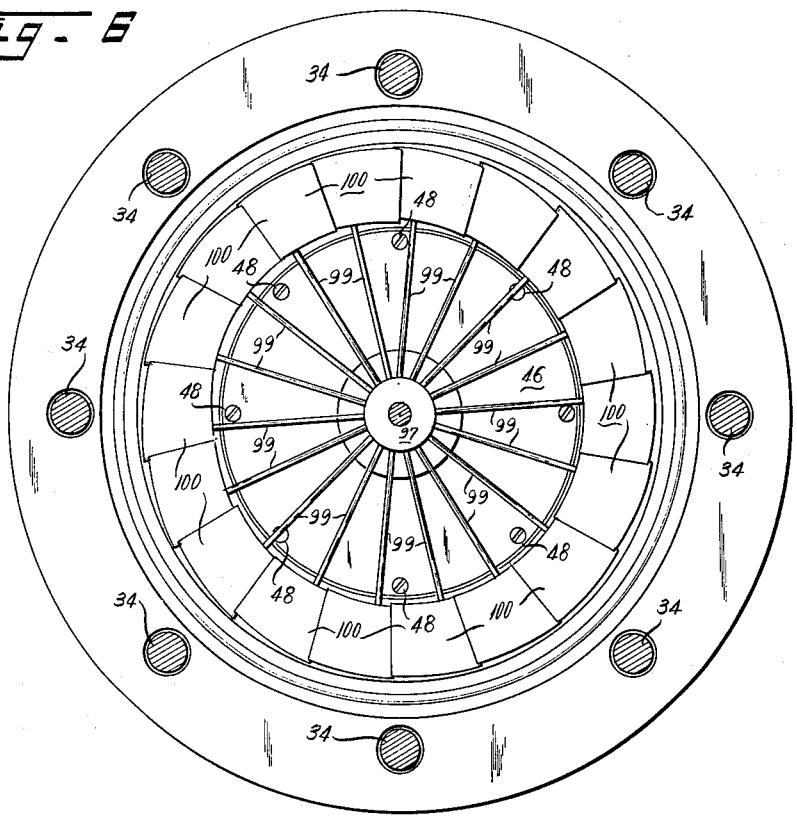
FIGURE 8 is substantially diametral sectional view of the turbine rotor of the meter of FIGURE 1.

FIGURES 1 to 14 illustrate a turbine meter constituting a practical embodiment of the principles of the present invention for use in metering all fluids except of high viscosity, this particular embodiment being particularly adapted in certain aspects for use in metering gases. Referring to FIGURES 1, 2 and 3, the turbine meter 20 is provided with a separable two-part housing comprising a first tubular inlet section 22 having an attachment pipe flange 24 welded to its outer end, and a coupling flange 26 welded thereto at its inner end, a second tubular outlet member 28 of equal diameter to tubular member 22 and coaxially aligned therewith and having a pipe attachment flange 30 welded to its outer end and a flange 32 welded to its inner end and in abutment with the flange 26 of member 22. As is clearly illustrated in FIGURE 2, the flanges 26 and 32 are piloted together in axial alignment and rigidly connected by equiangularly disposed screws 34. Fluid tight relationship between flanges 26 and 32 is maintained by an O-ring type sealing element 36 retained and compressed in an annular recess in the face of flange 26 abutting flange 32. The internal diameter of tubular members 22 and 28 is preferably equal to that of the conduit in which the meter 20 is interposed for fluid flow measuring purposes.

A suitably faired two-part core structure, consisting of an upstream unit 38 and a downstream unit 40, is mounted within the tubular members 22 and 28, respectively, in coaxial alignment therewith and houses the fluid metering structure and register drive mechanism. Core structure units 38 and 40 coact with the inner walls of members 22 and 28 to form a venturi of hollow form (constructed in accordance with the principles hereinafter set forth in detail) between the inlet end of meter 20 at flange 24 and the outlet end thereof at flange 30.

Core unit 38 comprises a hollow body member 42 having an end recess 44 receiving a bearing support 46 in axial alignment therewith and fixed thereto by screws 48, a plate 50 rigidly secured at the opposite end of member 42 by screws 52 and a nose piece 54 rigidly mounted upon the plate 50 by a stud bolt 56. The exterior surface 58 of the nose piece 54 is of suitable diverging cross-section in the direction of flow to convert the flow of gas or other fluid being metered from the cylindrical stream of the conduit being metered into an annular stream in the annular channel 60 defined between the exterior cylindrical surface of core member 42 and the interior cylindrical surface of housing member 22 constituting the venturi throat. Core unit 38 is coaxially supported within the tubular member 22 by radially extending ribs 62 which are equiangularly spaced about the common axis of the core unit 38 and tubular member 22 and which are rigidly connected to core member 42 by screws 64 and rigidly fixed to tubular member 22 by screws 66. Ribs 62 are faired at their opposite ends to minimize the turbulence in the stream resulting therefrom and are of such axial length as to eliminate any tangential component of the velocity of the fluid stream so that as the stream approaches the end of member 22, it has substantially pure axial flow.

The downstream core unit 40 is formed by a hollow member 68, the exterior surface 70 of which converges in the direction of fluid flow from a cylindrical portion 72 coaxial with and of equal diameter to the exterior surface of the member 42 to a tip 74 and is of suitable curvature to restore the pattern of fluid flow from the annular channel 60 to the cylindrical channel of the downstream pipe with minimum turbulence and minimum head loss. Member 68 is coaxially supported within the tubular member 28 by equiangularly spaced pairs of studs 76 and 78 which are threaded into the member 68 and by screws 80 which extend through the wall of the tubular member 28 and are threaded into the ends of the studs 76 and 78. A plate 82, apertured at 84, is mounted upon the end of member 68 adjacent the core unit 28 and supports a thrust bearing retainer 86.

The meter rotor assembly 88 consists of a shaft 90 formed of magnetic material journalled upon the member 46 by spaced radial bearings 92 and 94 and magnetically suspended by a predemagnetized permanent horseshoe magnet 96 mounted in the member 46 above the shaft 90, a spoked rotor wheel 98 terminating in equiangularly spaced turbine blades 100 at the periphery thereof disposed within and extending across the annular channel 60, and a permanent magnet type magnetic drive coupling driving element 102 fixed to the opposite end of shaft 90 exteriorly of the bearing 92. Bearings 92 and 94 are "olived" ring sapphire radial bearings. Their main function is to define the radial position of the rotor 88. They carry very little load since the weight of the rotor is supported by the magnetic suspension force of magnet 96 and the rotor is very well balanced. The small axial movement of the rotor 88 and shaft 90 (0.010 to 0.015 in.) during starting and stopping of the meter makes radial bearings 92 and 94 self cleaning. The resultant magnetic force of magnet 96 is of such magnitude as to counterbalance the weight of the rotor assembly 88, its line of action being through the center of gravity of assembly 88. The total weight of assembly 88 in one practical embodiment of the invention is 0.16 lb. and its moment of inertia is 0.50 lb.-in². The permanent magnet 96 is properly predemagnetized to such an extent that it will retain its residual magnetization indefinitely after it is installed in the turbine assembly. There should be sufficient gap (0.1 in. approximately in that practical embodiment) between the magnet 96 and shaft 90 so that unavoidable radial play of shaft 90 in bearings 92 and 94 does not change the magnetic force appreciably.

Figure 7:
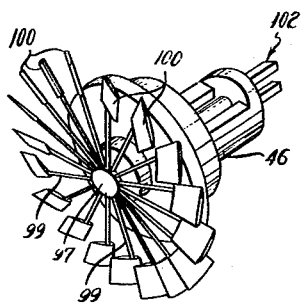
FIGURE 7 is a perspective view of the turbine rotor and support structure therefor of the meter of FIGURE 1.
Figure 9:
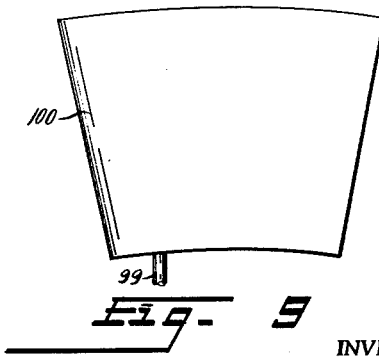
FIGURE 9 is a side elevational view of one of the blades of the rotor of FIGURE 8.

The turbine wheel 98 of the rotor 88 is disposed between the adjacent ends of core units 38 and 40 at the juncture of flanges 26 and 32 on housing members 22 and 28 and is readily accessible for servicing by removal of the tubular member 28 together with the core unit 40 mounted therein after detachment of the flanges 26 and 32. With the tubular member 28 and core unit 40 thus removed, the entire rotor assembly can be removed as a unit by removing screws 48 to detach the bearing support 46 from the core member 42. This sub-assemby is shown in FIGURE 7.

As the turbine meter shown in FIGURE 2 is basically designed for gas measurement, the structure of the turbine wheel 98 has the form similar to that shown in detail in FIGURES 4 to 12. It comprises a small hub 97 fixed to the end of shaft 90, having a plurality (eighteen in the disclosed embodiment) of spokes 99 projecting therefrom and each supporting one of a like plurality of blades 100. The blades 100 are of hollow construction formed of thin sheet material formed to the contours illustrated in FIGURES 9 to 12. Blades 100 are straight symmetrical low drag air foils with zero overlap (resulting in a solidity $\Sigma = 1.21$). The chords form an angle of 55.5° with the rotor axis in the illustrated embodiment. If slightly higher starting flow is acceptable, the profiled air foils may be replaced by straight flat plates in order to reduce cost.

Referring to FIGURE 4, thrust force of the rotor 88 is absorbed by a sapphire thrust bearing mounted on plug 104 which is resiliently backed by a compression spring 106 and mounted in the member 86 of the core unit 40 in axial alignment with the rotor assembly 88. The resilient support of this bearing prevents damage thereto during shipment. The normal thrust of the rotor 88 is very small, about 0.14 lb. at rated capacity of 20,000 ft. 3/hr. for air at atmospheric pressure in the said illustrated practical embodiment.

As is shown in FIGURES 4 and 5, the outer wall of the straight flow annular passage 60 of the turbine meter has a recess 107, properly proportioned for stability of flow into which the tips of the rotor blades 100 protrude with ample clearance radially and exactly 1/16″ or more.

Due to its inertia, fluid being metered passes through the straight flow annular passage 60 without deviating into the recess 107. The stability of this flow pattern is greatly strengthened by the centrifugal effect of the rigid body rotation of the fluid inside the recess 107 caused by the rotation of the blades 100. This device, which is denominated herein a "turblent seal," eliminates completely the leakage effect of the clearance between the rotor blades 100 and turbine housing 22, 26, 32, and 28 which otherwise is the main cause of the drop of accuracy of conventional type of turbine meter with increasing flow.

Figure 13:
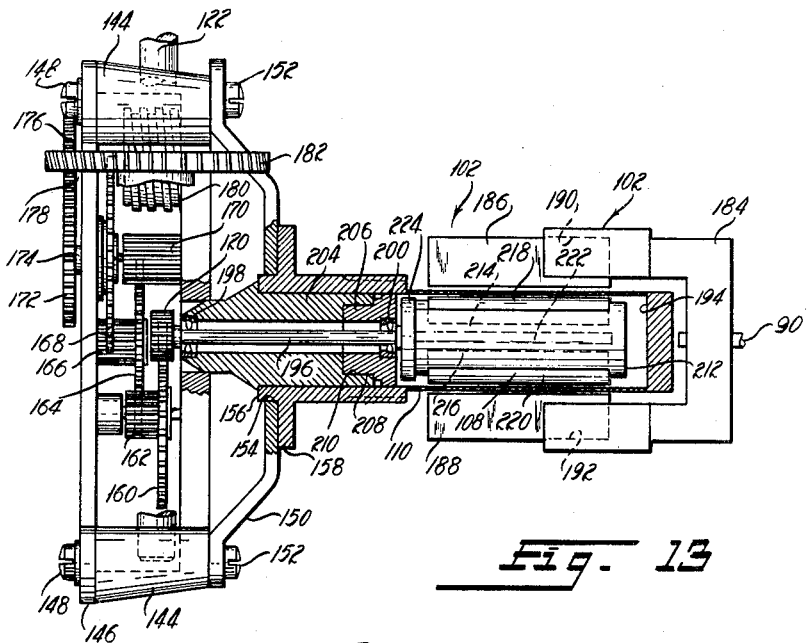
FIGURE 13 is a fragmentary longitudinal section through the register drive train and magnetic coupling of the meter of FIGURE 1.

Referring to FIGURES 2 and 13, the magnetic driving element 102 mounted on the left end of turbine rotor shaft 90 is magnetically coupled to a magnetic follower element 108 through a closed and non-magnetic tubular partition 110 forming a static fluid seal and which is mounted in fluid tight relation with the member 42 by a support plate 112 which is fixed to the member 42 by screws 114 and which is maintained in fluid tight relation therewith by a compressed O-ring 116 recessed in member 42 and with tubular partition 110 by a compressed O-ring 118 recessed in plate 112. The magnetic follower element 108 drives a pinion 120 which through a suitable gear train, as shown in FIGURES 2 and 3, is coupled to a vertically extending shaft 122 which is coaxially aligned with and coupled to a register drive shaft 124. Register drive shaft 124 (FIGURE 3) extends through a fixed tubular housing 126. Housing 126 extends through the annular channel 60 between members 22 and 42, being fixed to member 42 by an insert plug 128 which, in assembly, becomes substantially an integral part of member 42. Static fluid tight relation between housing 126 and plug 128 is established by an O-ring 130; housing 126 is mounted on member 22 by an insert member 132 welded to member 22. O-ring 134 forms a static fluid tight seal between housing 126 and insert 132.

The shaft 124 is coupled to an input shaft 136 of a conventional dial type indicator 138 (FIGURES 1 and 3) which is mounted upon the top of the meter 20 within an upstanding tubular housing 140 rigidly fixed in substantial radial relation to the exterior of the tubular member 22.

Figure 14:
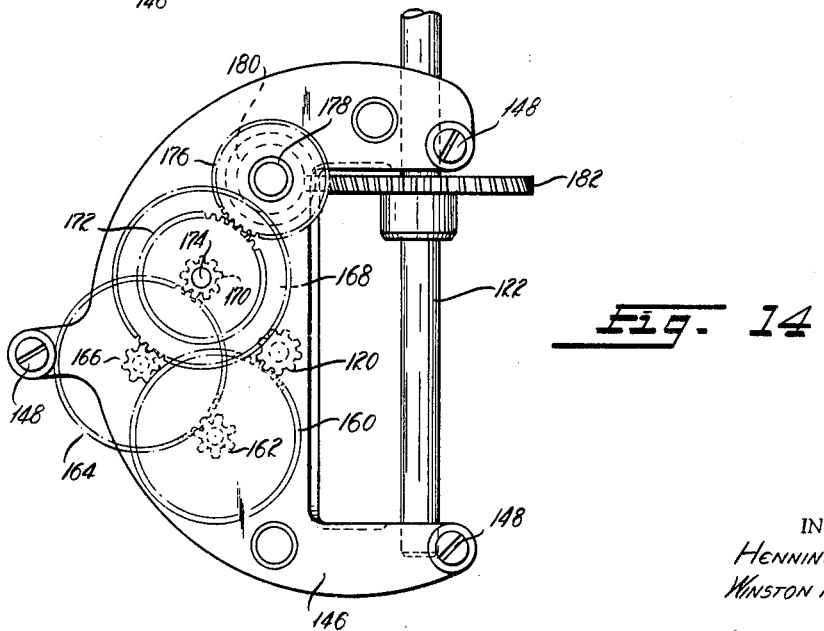
FIGURE 14 is a left end view of the assembly of FIGURE 13.

Referring now to FIGURES 13 and 14, the gear train between pinion 120 and shaft 122 is mounted on a pair of supports 144 and 146 which are rigidly connected by screws 148 and which are mounted upon the integral extension of the tubular partition 110 by a bracket 150. Bracket 150 is rigidly connected by screws 152 to the member 144 and is provided with a central aperture 154 in which is received in a piloting fit the cylindrical portion 156 of the tubular partition 110, the bracket 150 being in abutment with a radially extending flange 158 on tubular partition 110. The fit between aperture 154 and cylindrical portion 156 may either be a force fit or the elements may be braised together or otherwise fixed together to form a rigid assembly.

The gear train between pinion 120 and shaft 122 consists of a gear 160 journalled on member 144 in constant mesh with pinion 120, a pinion 162 rigidly coaxially fixed to the gear 160, a gear 164 journalled on the member 144 in constant mesh with the pinion 162, a pinion 166 rigidly coaxially fixed to the gear 164, a gear 168 journalled upon a boss 170 integal with the member 144 in constant mesh with the pinion 166, a gear 172 connected through member 146 by a shaft 174 for unitary coaxial rotation with gear 168, a gear 176 journalled on the plate 144 and 146 by a shaft 178 in constant mesh with the gear 172, a worm gear 180 fixed on the shaft 178, and a worm wheel 182 fixed on the shaft 122 and in constant mesh with the worm gear 180.

Structurally the magnetic drive coupling driving element 102 consists of a stainless steel yoke 184 coaxially fixed to the turbine rotor shaft 90 and a pair of square bar magnets 186 and 188 fixed in recesses 190 and 192 on the arms of the yoke 184 as by soft soldering. The longitudinal central axes of the square bar magnets 186 and 188 are equally spaced from the axis of the shaft 90 and parallel thereto and are disposed in equiangularly arranged surrounding relation to the tubular partition 110.

The follower magnet assembly is disposed within the closed and tubular well 194 of the tubular partition 110 and is mounted therein for coaxial rotation by a shaft 196 which is journalled in spaced bearings 198 and 200 which are supported by mating tubular bearing retainer members 204 and 206 respectively. Members 204 and 206 are maintained in coaxial alignment by the piloting engagement of the cylindrical surface 208 on member 206 with the cylindrical recess 210 in member 204 and are received in a piloting fit with the internal cylindrical wall of the tubular partition 110. Follower member 108 comprises a cylindrical plastic magnet support 212 having diametrically opposed semi-cylindrical recesses 214 and 216 cut in the periphery thereof to receive cylindrical follower magnets 218 and 220 respectively. Magnets 218 and 220 are preferably substantially coextensive in length with the driving magnets 186 and 188 are maintained in alignment therewith along the common axis of shaft 90 and 196. The plastic magnet support 212 is fixed to shaft 196 for rotation therewith by a pair of support pins 222 the coplanar axes of which are parallel to the axis of shaft 196 and offset from the recesses 214 and 216 and which project through apertures in the plastic magnet support 212 and which are supported at their free end by a flange 224 which is rigidly fixed coaxially to the shaft 196 to the right of the bearing 200.

As is explained fully in our said copending application Serial Number 634,662, the relation between the driving magnets 186 and 188 and the follower magnets 218 and 220 is such that, as the shaft 90 is rotated in response to fluid flow through the turbine blades 100 of the rotor assembly 88, the follower assembly 108 will be caused to rotate either by attraction of the follower magnets 218 and 220 to the driving magnets 186 and 188 or by repulsion of the follower magnets 218 and 220 from the driving magnets 186 and 188. The repulsion type drive coupling, because of its substantially lower backload on the turbine rotor 98, is presently considered essential for accuracy in metering low density fluids such as gases. In case of large size turbine meter in metering liquids, some backload on the turbine rotor can be tolerated without appreciable effect on the meter accuracy. The attraction type drive coupling is preferred because of its higher transmission torque, higher acceleration and higher pickup speed than the repulsion type of same size. Rotation of the follower 108 imparts rotation to the shaft 196 and the pinion 120 which is fixed to the end thereof exteriorly of the bearing 198 to impart rotation to the register drive shaft 122 through the gear train illustrated in FIGURES 13 and 14 and previously described.

From the foregoing description, it is apparent from FIGURES 2 and 3, that the plate 50, seal 51, member 42, plate 112, seals 116 and 118 and tubular partition 110 define a sealed chamber 230 which is isolated from the fluid flowing through the channel 60 by the tubular housing 126 which is provided with seals 130 and 134 the rotary motion of the follower 108 is transmitted to the register mechanism 138 exteriorly of the meter housing members 22 and 28 without the use of any dynamic fluid seals such as stuffing boxes and thus provide a fluid tight register assembly with very small mechanical friction. If further detailed information is considered to be necessary as to the detailed construction of the magnetic drive coupling, reference is hereby made to the disclossure of our said copending application Serial Number 634,662.

FIGURE 15 illustrates a modified version of the turbine meter of FIGURES 1 to 14. The FIGURE 15 embodiment is particularly adapted for metering liquids and, in the actual physical embodiment, is substantially larger than the embodiment of FIGURES 1 to 14. Structurally the meters are identical with the exception of the rotor structure and mounting. The meter comprises coaxial tubular housing sections 300 and 302 fixed together by bolts 304 and maintained in fluid tight relation by a compressed O-ring 306, coaxial equal diameter core sections 308 and 310 coaxially mounted in housing sections 300 and 302 respectively to define an annular channel 312 forming the throat of a venturi of hollow form, and a turbine rotor 314 interposed between the opposed ends of core sections 308 and 310.

The turbine rotor 314 comprises a central hub 316 fixed to a shaft 318 which is journalled at its opposite ends by opposed ball thrust type anti-friction bearings 320 and 322 carried coaxially by core sections 308 and 310 respectively, an annular rim 324 supported from hub 316 by a plurality of spokes 326 arranged substantially in the same manner as the wire spokes of a bicycle wheel, and a plurality of equiangularly disposed blades 328 mounted on the exterior of the rim 324 to extend transversely across the passage 312, the tips thereof projecting into an annular recess 330 forming a turbulent seal as in the first embodiment.

The blades 328, as is clearly shown in FIGURES 16 to 18 are solid, symmetrical, but twisted airfoil blades inserted in the ring. Each blade 328 is so twisted that it has the same angle of attack for uniform axial velocity distribution of inlet flow throughout the entire length of the blade from root to tip. The blade angle is 55.5° at blade tip and is reduced to 41.5° at blade root, both measured from the axial direction. The length of the chord of the blades are such that zero overlap between blades is maintained throughout the entire length of the blades resulting in a solidity $\sigma=1.2$ at blade tip and $\sigma=1.5$ at blade root.

In the meter of FIGURE 15, the register is located downstream of the turbine rotor 314, being driven from a shaft 332 which is drive coupled to the turbine rotor shaft 318 as shown. The structure of the register and its coupling through a magnetic drive coupling to shaft 332 is the same as in the first embodiment. No magnetic suspension of the turbine rotor 314 or shaft 332 of turbine meter of large size is necessary in metering liquids and the magnetic drive coupling to the register may be of the attraction type in metering liquids.

ANALYSIS OF THE TURBINE METER IN FLUIDS OF LOW AND MEDIUM VISCOSITIES

Figure 19:
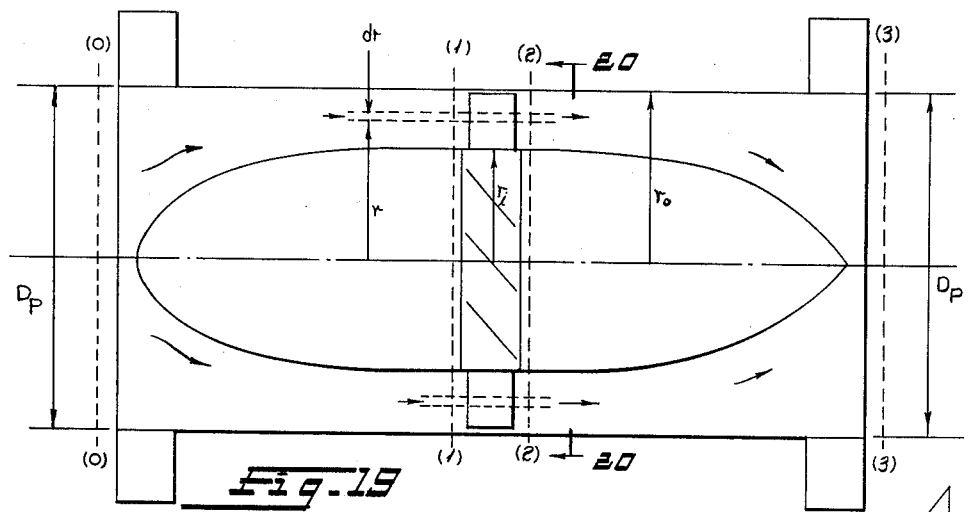
FIGURE 19 is a diagrammatic illustration of a longitudinal sectional view through a turbine meter.
Figure 20:
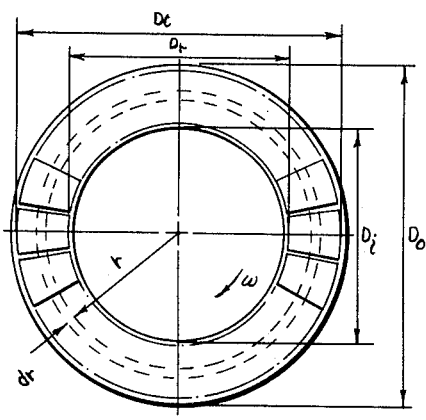
FIGURE 20 is a transverse sectional view through the turbine meter of FIGURE 19 taken substantially on the line 20—20 of FIGURE 19.
Figure 21:
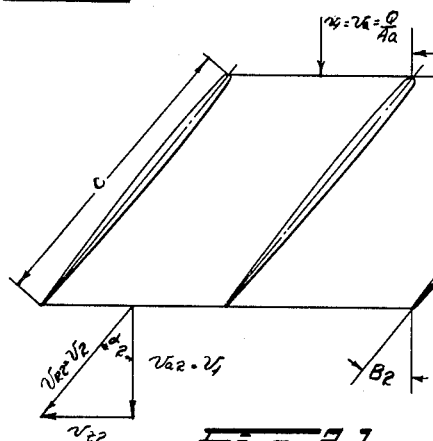
FIGURE 21 is a velocity diagram at starting condition of an axial-flow turbine meter as illustrated in FIGURE 19.

A. Starting condition (FIGURES 19 to 21)

By means of flow straighteners and proper design of the turbine housing and approaching hub, the inlet velocity $v_1$ to the turbine blade can be assumed to be purely axial and uniformly distributed across the entire annular flow passage.

Consider first the instant just before the turbine starts to rotate. The driving torque $T_d$ exerted on the blades by the fluid is just in balance with the total resisting torque $T_r$ with turbine standing still. FIGURE 21 shows the velocity diagrams at this instant.

The driving torque $dT_d$ on the blade elements within the annular stream $dr$ between Sections 1 and 2 of the blades at radius $r$ from the axis of rotation (FIGURES 19 and 20) is found from the angular-momentum law to be $$dT_d = (\rho dQ) r (v_{v_{t2}}) \tag{1}$$

where $dQ$ = rate of flow through the stream tube $dr$,
$\rho$ = mass density of the fluid
$r_{v_{t2}}$ = tangential component of the absolute outlet velocity $v_2$ at distance $r$ from axis of rotation.

It can be shown that the element $dr$ of the blades will behave as though it had a constant inlet velocity over its radial length equal to that at the mean radius $r_m$ where $$r_m = \sqrt{\frac{r_0^2 + r_i^2}{2}} \tag{2}$$

which means that $r_m$ will divide the annular area between $r_0$ (radius of the turbine housing) and $r_0$ (radius of the turbine hub) into two portions of equal area and thus the mass flow through each area is the same.

Summing over the entire annular cross section Aa, we get $$T_d = \int_{A_a} dT_d = \rho Q_s r_m m_{v_{t2}} \tag{3}$$

where $Q_s$ = rate of flow just before the turbine starts to rotate, henceforth called "starting flow."
$m_{v_{t2}}$ = tangential component of absolute outlet velocity $v_2$ at mean radius $r_m$.

Assume the flow through the blades is incompressible or strictly uncompressed. This can be justified here even for gases because the pressure drop across the properly designed blades is extremely low in comparison with the line pressure $$\left(\frac{\Delta P}{P} < 0.5\%\right)$$

Then by continuity and by the condition that the diameters of hub and housing are uniform between Sections 1 and 2:

$$m_{v_{a2}} = v_1 = v_a = Q/A_a$$

where $$A_a = \pi(r_0^2 - r_i^2) = \pi r_0^2 \left[1 - \left(\frac{r_i}{r_0}\right)^2\right]$$

the effective flow area of annular cross section. For a turbine meter of which $$\frac{r_i}{r_0}$$

is not far from unity, $A_a \approx 2\pi r_m L$ for first approximation where $L = (r_0 - r_z)$, the effective blade length.

Thus $$m_{v_{t2}} = v_1 \tan m_{\alpha_2} = \frac{Q_s}{A_a} \tan m_{\alpha_2} \quad (4)$$

where $m_{\alpha_2}$ is the fluid outlet angle at mean radius $r_m$ measured from the axial direction, substitute (4) into (3)

$$T_d = \frac{r_m}{A_a} \tan m_{\alpha_2} \cdot \rho Q_s^2$$

$$\approx \frac{1}{2\pi L} \tan m_{\alpha_2} \cdot \rho Q_s^2 \quad (5)$$

Or, expressing in terms of inlet flow velocity $v_1$ in the annular cross section, $$Q_s \approx \sqrt{\frac{T_r}{\frac{\rho}{2\pi L} \tan m_{\beta 2}}}$$

$$= \sqrt{\left\{\frac{T_m}{\frac{\rho}{2\pi L}\left[\tan m_{\beta 2} - \left(2\pi \frac{L}{D_m}\right)K_t\right]}\right\} + \left\{\frac{1/2 K_v \mu}{\frac{\rho}{2\pi L}\left[\tan m_{\beta 2} - \left(2\pi \frac{L}{D_m}\right)K_t\right]}\right\}^2 + \left\{\frac{1/2 K_v \mu}{\frac{\rho}{2\pi L}\left[\tan m_{\beta 2} - \left(2\pi \frac{L}{D_m}\right)K_t\right]}\right\}}$$

(8)

$$T_d = r_m A_a \tan m_{\alpha_2} \rho v_1^2$$

$$\approx 2\pi L r_m^2 \tan m_{\alpha_2} \rho v_1^2 \quad (5a)$$

Equations 5 and 5a indicate that the driving torque available for a given turbine meter is directly proportional to the density $\rho$ of the fluid and proportional to the square of the flow rate (or inlet flow velocity). For a given inlet flow velocity of a given fluid, $T_d$ increases approximately with the third power of the mean radius of the meter and increases with the increase of the fluid outlet angle $\alpha_2$ measured from the axial direction. Both experiment and analysis reveal that the blades of a high accuracy turbine meter should be sufficiently close so that the deviation between the actual outlet direction $\alpha_2$ of the fluid flow and the blade outlet angle $\beta_2$ is negligibly small, i.e., $\alpha_2 \approx \beta_2$. Then $$T_d \approx \frac{r_m}{A_a} \tan m_{\beta 2} \rho Q_s^2 \quad (5b)$$

At starting condition, the driving torque equals the total resisting torque $T_d = T_r$. The total resisting torque $T_r$ consists of mechanical friction $T_m$ and fluid friction $T_f$. The mechanical friction $T_m$, which contains mainly bearing friction and register load is of Coulomb nature, is independent of flow rate $Q$. The fluid friction $T_f$, which consists mainly of the blade entrance loss, blade profile drag loss and the blade exit loss, depends upon the flow rate $Q$, the density $\rho$, the viscosity $\mu$ of the fluid, and the geometric arrangement of the blade system. Because of the complicated nature of the flow pattern through the blade system, the determination of individual items of fluid friction is difficult with the present knowledge of fluid mechanics. However, the fluid friction $T_f$ can be considered to consist of the following: (1) resisting torque $T_\nu$ due to viscous friction which is controlled by viscosity forces and is linearly proportional to flow velocity, (2) resisting torque $T_t$ due to turbulent friction which is controlled by inertia forces and is proportional to the square of the flow velocity. Then, the total resisting torque can be expressed as $$T_r = T_m + T_f$$
$$= T_m + T_\nu + T_t$$
$$= T_m + K_v \mu Q_s + K_t \rho \frac{Q_s^2}{D_m} \quad (7)$$

Where $D_m = 2r_m$ $K_v$ = dimensionless coefficient determine $T_\nu$ — henceforth called "viscous coefficient" of the turbine meter at starting condition $K_v$ depends largely upon the particular design and arrangement of the rotor and the relative clearance between the rotor and its adjacent stationary parts. The accurate determination of $K_v$ can only be obtained by actual test.

$K_t$ = dimensionless coefficient determining $T_t$ — henceforth called "turbent coefficient" of the turbine meter at the starting condition. $K_t$ depends largely upon the particular shape of the blades, blade angles and solidity ratio of the blade system. The accurate determination of $K_t$ can only be obtained by actual test.

From Equations 5, 6 and 7, the starting flow $Q_s$ can be solved and is given by For all fluids (such as air, gases, water, gasoline, thin fuel oil, etc.) except of high viscosity and for turbine meters specially designed to attain minimum value of the viscous coefficient $K_v$, the viscous friction $T_\nu$ is usually considerably smaller than either the turbulent friction $T_t$ or the mechanical friction $T_m$ at starting condition. Equation 8 then becomes $$Q_s \approx \sqrt{\frac{T_m}{\frac{\rho}{2\pi L}\left[\tan m\beta_2 - \left(2\pi \frac{L}{D_m}\right)K_t\right]}} \quad (9)$$

Both theoretical analysis and actual test results indicate that there is a definite relation between the starting flow $Q_s$ and the minimum flow of the operating flow range $Q_{min}$. For a properly designed turbine meter for fluids of low viscosity $$\frac{Q_{min}}{Q_s} \approx 10 \text{ to } 16$$

depending upon the accuracy requirement of the turbine meter. It becomes thus evident that low value of starting flow $Q_s$ is one of the necessary conditions for a high accuracy turbine meter with large operating flow range or large flow ratio. The following conclusions are derived from the study of Equations 8 and 9.

(1) The mechanical friction $T_m$ should be made as low as practical.

(2) The blades should be reasonably short for given diameter of the turbine meter to obtain low values of $$\frac{L}{D_m} \text{ and } L$$

(3) The blades should be slanted rather sharply to obtain large value of $\tan \beta_2$.

(4) The turbine blades should have airfoil section with well-rounded leading edge and sharp trailing edge to reduce $K_t$ and $K_v$.

(5) The starting flow $Q_s$ is approximately inversely proportional to the square root of the density $\rho$ of the fluid. A turbine meter can thus tolerate much more mechanical friction $T_m$ when used to measure liquids than to measure gases. Also it can stand considerably larger $T_m$ in the case of gas at high pressure than at low pressure.

B. "Synchronous" condition

"Synchronous" here is used to indicate the condition when the turbine meter is in steady rotation. Again, from the angular-momentum theorem, the driving torque $T_d$ available at synchronous condition is $$T_d = \rho Q r_m m_{v_{t2}}$$

Figure 22:
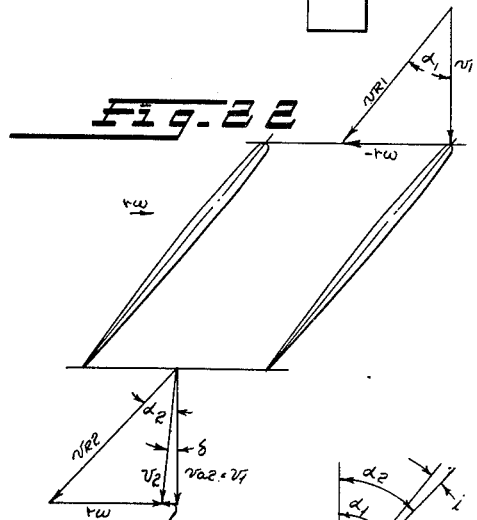
FIGURES 22 and 23 are a velocity diagram at synchronous speed of the turbine meter of FIGURE 19.
Figure 23:
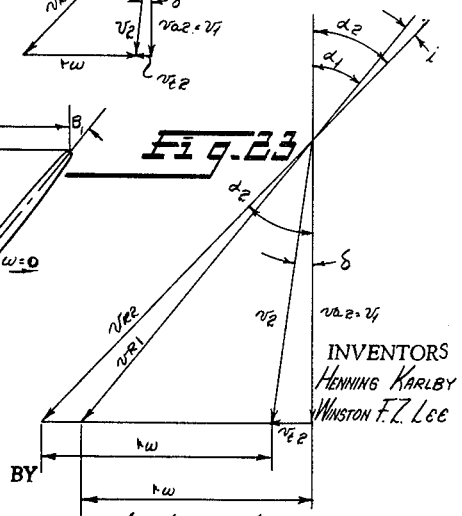

From velocity diagram as shown in FIGURES 22 and 23

$$m_{vt2} = v_1 \tan m_{a2} - r_m \omega$$

where $\omega$ is the angular velocity of the turbine rotor.
Therefore $$T_d = \left[\frac{r_m}{A_a} \tan m_{a2} - \frac{r_m^2 \omega}{Q}\right] \rho Q^2 \quad (10)$$

At synchronous condition $$T_d = T_r$$

Where $T_r$ is the total resisting torque to the motion of the rotating system of the turbine meter. The total resisting torque $T_r$ can be treated as consisting of the following three components similar to the case of starting condition.

$$T_r = T_m + T_v + T_t$$

$$= T_m + C_v \mu Q + C_t \rho \frac{Q^2}{D_m} \quad (11)$$

where $C_v$ = dimensionless coefficient determining viscous friction $T_v$—henceforth called "viscous coefficient" of the turbine meter at synchronous condition. $C_v$ depends largely upon the design of the blades as well as the entire rotor assembly, the relative clearance between the rotor assembly and its adjacent stationary parts. The accurate determination of $C_v$ can only be obtained by actual test.

$C_t$ = dimensionless coefficient determining turbulent friction $T_t$—henceforth called "turbulent coefficient" of the turbine meter at synchronous condition. $C_t$ depends largely upon the shape the blade angles and solidity ratio of the blade system, the design of the rotor spokes (or disc) and other parts of the rotor assembly. The accurate determination of $C_t$ can only be obtained by actual test.

It is noted that while at synchronous condition the mechanical friction $T_m$ is essentially the same as in the case of starting condition, the coefficients $C_v$ and $C_t$ of both the viscous friction $T_v$ and turbulent friction $T_t$ are somewhat different from $K_v$ and $K_t$ (Equation 7) for the starting condition. This is due to the following main reasons:

(a) Since the rotor assembly is no longer standing still, there are additional fluid frictions besides blade losses due to the rotation of the rotor spokes (or disc) rotor hub and other parts of the rotor assembly. Strictly speaking, these fluid frictions depend upon the rotating speed of the rotor rather than flow rate $Q$. However, within the operating range of the turbine meter $\omega \alpha Q$. Equation 11 can therefore be justified. The presence of these additional fluid frictions tends to raise the values of $C_v$ and $C_t$ over $K_v$ and $K_t$ respectively.

(b) The angle of attack $\iota_1 = (\beta_1 - \alpha_1)$ of the blade system at synchronous speed is much smaller than the angle of attack $\iota_1 = \beta_1$ at starting condition. This decrease in blade losses tends to reduce values of $C_v$ and $C_t$ considerably below $K_v$ and $K_t$ respectively.

Equating Equations 10 and 11 and solving for $$\frac{\omega}{Q}$$

$$\frac{\omega}{Q} = \frac{1}{r_m A_a} \left\{ \tan m_{a2} - \left[\frac{T_t + T_v + T_m}{\frac{r_m}{A_a} \rho Q^2}\right] \right\}$$

$$= \frac{1}{r_m A_a} \left\{ \tan m_{a2} - \left[\left(\frac{A_a}{2r_m^2} C_t\right) + \left(\frac{A_a}{r_m} \frac{\mu}{\rho} \frac{C_v}{Q}\right) + \left(\frac{A_a}{r_m \rho} \frac{T_m}{Q^2}\right)\right] \right\}$$

$$= \left(\frac{1}{r_m A_a} \tan m_{a2}\right) - \left(\frac{1}{2r_m^3} C_t\right) - \left(\frac{1}{r_m^2} \frac{\mu}{\rho} \frac{C_v}{Q}\right) - \left(\frac{T_m}{r_m^2 \rho Q^2}\right) \quad (12)$$

Or, as expressed in dimensionless quantities:

$$\frac{r_m \omega}{Q/A_a} = \frac{m_{vb}}{v_1} =$$

$$\left\{ \tan m_{a2} - \left[\left(\frac{A_a}{2r_m^2} C_t\right) + \left(\frac{A_a}{\pi r_m^2} \cdot \frac{C_v}{R_a}\right) + \left(\frac{T_m/r_m}{\frac{1}{A_a} \rho Q^2}\right)\right] \right\} \quad (12a)$$

where $m_{vb} = r_m \omega$ = blade velocity at means radius $r_m$ of the turbine meter.

$$R_a = \frac{(2L) v_1 \rho}{\mu} = \text{Reynolds member}$$

of the annular flow passage—a direct measure of the ratio of turbulent friction to viscous friction of the flow.

Equation 12 indicates that the actual speed of the turbine meter per unit flow rate $$\left(\frac{\omega}{Q}\right)$$

is equal to its ideal value $$\left(\frac{1}{r_m A_a} \tan m_{a2}\right)$$

less the slip of the rotor due to the following three component losses: (a) slip due to the turbulent friction $$\left(\frac{1}{2r_m^3} C_t\right)$$

(b) slip due to the viscous friction $$\left(\frac{1}{r_m^2} \frac{\mu}{\rho} \frac{C_v}{Q}\right)$$

and (c) slip due to the mechanical friction $$\left(\frac{T_m}{r_m^2 \rho Q^2}\right)$$

It is noted that the slip due to turbulent friction depends upon the turbulent coefficient $C_t$ and is independent of the flow rate $Q$. The slip due to viscous friction is inversely proportional to $Q$ and thus its effect on meter accuracy decreases as flow rate $Q$ increases. The slip due to mechanical friction is inversely proportional to the square of the flow rate. It, therefore, has a pronounced effect on the turbine meter accuracy at low flows and becomes relatively unimportant at high flows.

Except for fluids of high viscosity, the flow in a turbine meter of reasonable size within its operating flow range will be turbulent in nearly all practical applications. With the turbine meter properly designed for the low value of the viscous coefficient $C_v$, the viscous friction $T_v = C_v \mu Q$ is usually small in comparison with turbulent friction $$T_t = C_t \rho \frac{Q^2}{D_m}$$

within the operating flow range. Then Equations 12 and 12a become $$\frac{\omega}{Q} = \frac{1}{r_m A_a} \left\{ \tan m_{a2} - \left[\left(\frac{A_a}{2r_m^2} C_t\right) + \left(\frac{A_a}{r_m} \frac{T_m}{\rho Q^2}\right)\right] \right\} \quad (13)$$

$$\frac{m_{vb}}{v_a} = \left\{ \tan m_{a2} - \left[\left(\frac{A_a}{2r_m^2} C_t\right) + \left(\frac{A_a}{r_m} \cdot \frac{T_m}{\rho Q^2}\right)\right] \right\} \quad (13a)$$

An ideal turbine meter for direct and accurate measurement of fluid flow requires that the speed of the turbine meter per unit flow rate $$\frac{\omega}{Q}$$

(or similarly, the number of revolutions of the turbine meter per unit volume of the fluid passed) remains constant throughout the entire operating flow range. An actual turbine meter will approach the ideal if the right side of the Equation 13

$$\left\{\tan m_{\alpha 2} - \left[\left(\frac{A_a}{2r_m^2}C_t\right) + \left(\frac{A_a}{r_m}\cdot\frac{T_m}{\rho Q^2}\right)\right]\right\}$$

is a constant. This defines the requirements for the linear relationship between the turbine speed and the rate of flow which a turbine meter of high accuracy must meet throughout its entire operating flow range when dealing with all fluids including those of high viscosity.

(1) The fluid outlet angle $\alpha_2$ should be constant. This can be accomplished by using sufficiently close-spaced blading so that the fluid outlet angle $\alpha_2$ approaches the blade outlet angle $\beta_2$ with negligible deviation, i.e., $\alpha_2 = \beta_2 =$ constant.

(2) The mechanical friction $T_m$ must be made small so that the slip of the rotor due to $T_m$ should be negligible even at $Q_{min}$ (minimum flow of the operating flow range). For a turbine meter measuring fluids of low density such gases at low pressure, the mechanical friction $T_m$ is especially harmful and must be reduced to a bare minimum since the slip is inversely proportional to the fluid density $\rho$ [Equation 13].

(3) The turbulent coefficient $C_t$ of the turbine meter should remain a constant for all flow rates within the entire operating flow range. Since $C_t$ does vary somewhat with flow rate, the value of $C_t$ should be minimized. These two requirements of $C_t$ can be approached by using properly designed low drag airfoil blades with optimum blade angles, twist and solidity (blade length/blade spacing) together with properly designed annular flow passage both upstream and immediately downstream of the rotating blades.

(4) The viscous coefficient $C_v$ should be kept as low as practical. This suggests that (i) close running clearances should be avoided whenever possible, (ii) surface area of the rotor assembly subjected to viscous friction be kept to a bare minimum.

C. *Minimum flow of the operating flow range—$Q_{min}$*

The minimum flow of the operating flow range $Q_{min}$ of a turbine meter can be approximated in terms of starting flow $Q_s$ by substituting Equation 9 into Equation 13 with the first approximate relation $K_t \approx C_t$:

$$\frac{\omega}{Q_{min}} \approx \frac{1}{r_m A_a}\left[\tan m_{\beta 2} - \left(\frac{A_a}{2r_m^2}\right)C_t\right]\left[1 - \frac{Q_s^2}{Q_{min}^2}\right]$$

Assuming the turbine meter be allowed a variator of $\pm \epsilon$ in percentage of registration within its operating flow range $$\frac{Q_s^2}{Q_{min}^2} \approx 2\epsilon$$

or $$Q_{min} \approx \frac{1}{\sqrt{2\epsilon}}Q_s$$

If the allowable error $\epsilon = 0.5\%$ $$Q_{min} \approx 10\ Q_s$$

If $\epsilon = 0.2\%$ $$Q_{min} \approx 15.7\ Q_s$$

D. *Angle of incidence of the blade system and the angle of fluid deflection*

For a properly designed turbine meter working within its range, the angle of incidence of the blade system and the angle of fluid deflection when passing through the blades (angles $\iota$ and $\delta$ respectively, FIGURES 22 and 23) can be readily estimated as follows:

Experimental results and analysis indicate that the total slip of a well designed turbine meter ($\beta_2 \approx \alpha_2$) working in its operating range is well within 7%, $$\frac{m_{\nu t2}}{\nu_a \tan m_{\beta 2}} < 7\% \text{ or } \frac{m_{\nu t2}}{\nu_a} < 0.07 \tan m_{\beta 2} \quad (15)$$

For the sake of simple construction and low cost, it is very desirable to use symmetrical blades if they give satisfactory performance (to be discussed in detail later). For a symmetrical blade system $$m_{\beta 1} = m_{\beta 2} \tan m_{\alpha 1} = \frac{r_m \omega}{\nu_a} = \left(\frac{r_m \omega + m_{\nu t2}}{\nu_a}\right) - \left(\frac{m_{\nu t2}}{\nu_a}\right)$$

$$= \tan m_{\beta 2} - \left(\frac{m_{\nu t2}}{\nu_a}\right)$$

From Equation (15)

$$\tan m_{\alpha 1} > (\tan m_{\beta 2} - 0.07 \tan m_{\beta 2}) = 0.93 \tan m_{\beta 2} \quad (16)$$

For the desirable range of blade angle $40° < \beta_2 < 60°$ (to be discussed in detail later), Equation 16 gives:

$$(m_{\beta 2} - \alpha_1) < 2°$$

But $$(m_{\beta 2} - m_{\alpha 1}) = (m_{\beta 1} - m_{\alpha 1})$$

for symmetric blade system and $$(m_{\beta 1} - m_{\alpha 1})$$

is the angle of incidence of the blade system at the mean radius $r_m$ (FIGURE 23). Therefore $$m_\iota = m_{\beta 1} - m_{\alpha 1} < 2° \quad (17)$$

For a properly selected low drag symmetric airfoil, the drag coefficient remains very low and constant for all values of angle of attack (or incidence) from 0° to 2°. It may thus be concluded that symmetric airfoils will be satisfactory and no curved blades are necessary in practically all applications of the turbine meter.

Referring to FIGURES 22 and 23, the change of absolute angular displacement of the fluid when passing through the blade or the angle of fluid deflection at mean radius $r_m$ as given by $$m_\delta = \text{arc tan}\left(\frac{m_{\nu t2}}{\nu_a}\right) \text{ or } \tan m_\delta = \frac{m_{\nu t2}}{\nu_a}$$

From Equation 15

$$\tan m_\delta = \frac{m_{\nu t2}}{\nu_a} < 0.07 \tan m_{\beta 2} \quad (18)$$

For desirable range of blade angle $40° < m_{\beta 2} < 60°$. Equation 18 gives $$m_\delta < 69° \quad (19)$$

Since the fluid possesses very low tangential velocity when leaving the blade system as indicated by the above equation, no pressure recovery should be attempted.

E. *Head loss of the turbine meter*

The total head loss across a turbine meter, H, can be separated into two parts: (i) loss across the moving blades. Let it be designated as the blade loss $H_b$, and (ii) all other losses across the meter, mainly by the loss due to venturi. Let it be designated as the venturi loss $H_\nu$.

The blade loss could be further separated as (a) loss to overcome mechanical friction, (b) loss due to profile drag on the blades, (c) loss due to annular drag corresponding to friction of walls and (d) secondary flow losses such as loss due to trailing vortices, etc. However, within the operating flow range of the turbine meter, the blade loss can be treated as a whole by the use of an overall loss coefficient $C_b$ $$H_b = C_b \cdot \tfrac{1}{2}\rho(m_{\nu R})^2$$

where $m_{\nu R} = \tfrac{1}{2}(m_{\nu R1} + m_{\nu R2})$ the average relative velocity of fluid when passing through the blades.

$C_b =$ blade loss coefficient, depending upon the blade design and operating conditions, especially the angle of attack. Actual value of $C_b$ can be found by test.

But from Figures 22 and 23, $$m_{\nu R} \approx m_{\nu R2} = \frac{m_{\nu a2}}{\cos m_{\beta2}} = \frac{Q}{A_a} \cdot \frac{1}{\cos m_{\beta2}}$$

Then $$H_b = C_b \left(\frac{1}{A_a \cos m_{\beta2}}\right)^2 \cdot \frac{1}{2}\rho Q^2 \quad (20)$$

The venturi loss $H_v$ depends upon the amount of change of kinetic energy of fluid when passing through the blade section (section 1 or 2, FIGURE 20) from the kinetic energy in the pipe section (section 0 or 3, FIGURE 20). It can be expressed as $$H_v = C_v \frac{1}{2}\rho (v_a^2 - v_p^2)$$

where $v_a$=fluid velocity in the annular cross section 1 or 2.
$v_p$=fluid velocity in the pipeline before entering or after leaving the meter.
$C_v$=venturi loss coefficient depending upon the design of the flow passage through the meter, the area ratio, and Reynolds number. It can be determined by actual test.

But $$v_a = \frac{Q}{A_a}, v_p = \frac{Q}{A_p}$$

where $A_p$ is the cross-sectional area of the pipe $$H_v = C_v \left(\frac{1}{A_a^2} - \frac{1}{A_p^2}\right) \cdot \frac{1}{2}\rho Q^2 \quad (21)$$

The total head loss of the turbine meter is thus equal to $$H = \left(\frac{1}{A_a^2}\right)\left[\frac{C_b}{\cos m_{\beta2}^2} + C_v\left(1 - \frac{A_a^2}{A_p^2}\right)\right]\frac{1}{2}\rho Q^2 \quad (22)$$

From the above equation, it is noted that (1) The head loss of the meter is directly proportional to the density of fluid passing through the meter since $H \alpha \rho$. For gas at a given temperature, $\rho \alpha p$ where $p$ is essentially the line pressure, the absolute head loss of a turbine gas meter is directly proportional to the line pressure.

(2) The head loss of the meter is proportional to the square of the flow rate since $H \alpha Q^2$. Therefore, the maximum head loss of the meter occurs at maximum flow rate $Q_{max}$ and is given by $$H_{max.} = \left(\frac{1}{A_a^2}\right)\left[\frac{C_b}{\cos m_{\beta2}^2} + C_v\left(1 - \frac{A_a^2}{A_p^2}\right)\right]\frac{1}{2}\rho (Q_{max.})^2 \quad (23)$$

(3) Low head loss requires large annular flow area $A_a$ of the meter, less slanted blades (i.e., small blade angle $\beta_2$ measured from the axial direction) and a venturi flow path with low flow loss but still economic dimensions.

F. Transient response of the turbine meter

The transient response of the turbine meter is best described by the time constant of the rotor when subjected to a step change in fluid velocity. That is, if an instantaneous increase occurs in the flow rate, say from $Q_1$ to $Q_2$, the rotor will accelerate from a speed $\omega_1$, corresponding to the original flow rate $Q_1$ to a speed $\omega_2$ corresponding to the new flow rate $Q_2$. The time required to accelerate the rotor to its new speed (or some fraction of its new speed) is a measure of the time constant of the rotor.

Assume both $Q_1$ and $Q_2$ are within the operating flow range of the meter. Let $\omega$ be the instantaneous speed of the rotor at any instant $t$ during the period of acceleration of the rotor. At the new constant flow rate $Q_2$, the driving torque and the resisting torque are given by Equations 10 and 11 respectively $$T_d = \left[\frac{r_m}{A_m} \tan m_{\beta2} - \frac{r_m^2}{Q_2}\omega\right]\rho(Q_2)^2$$

$$T_r = T_m + C_v \eta Q_2 + C_t \rho \frac{(Q_2)^2}{D_m} \approx C_t \rho \frac{(Q_2)^2}{D_m}$$

The last approximation can be justified for a turbine meter working within its operating range and for fluids not of high viscosity. Since $\omega < \omega_2$, therefore $T_d > T_r$. By Newton's 2nd law of motion $$T_d - T_r = I\frac{d\omega}{dt}$$

where $I$ is the moment of inertia of the rotor assembly about the axis of the rotor. From the last three equations together with the Equation 12 which gives the approximate relation $$\omega_2 \approx \frac{1}{r_m^2}\left[\frac{r_m}{A_a} \tan m_{\beta2} - \frac{C_t}{2r_m}\right]Q_2$$

it can be readily shown that $$\int_0^t dt = \int_{\omega_1}^\omega \frac{d\omega}{\frac{r_m^2 \rho Q_2}{I}(\omega_2 - \omega)}$$

$$t = \left(\frac{I}{r_m^2 \rho Q_2}\right)\left[\log\left(\frac{\omega_2 - \omega_1}{\omega_2 - \omega}\right)\right] \quad (24)$$

Or, the above equation can be expressed in another form to give the rotor speed $\omega$ as a function of time $t=$ $$\frac{\omega}{\omega_2} = 1 - \left(1 - \frac{\omega_1}{\omega_2}\right)e^{-\frac{t}{I/r_m^2 \rho Q_2}} \quad (24a)$$

where $e$ is the base of natural logarithms. Equation 24a is plotted in FIGURE 24. It is seen that the rotor speed $\omega$ is an exponential function of time and its time constant $\tau$ is $(I/r_m^2 \rho Q_2)$ which is the time required for the rotor to attain $$\left(1 - \frac{1}{e}\right) = 63.2\%$$

of the imposed velocity increment $(\omega_2 - \omega_1)$. This time required is directly proportional to the moment of inertia $I$ and inversely proportional to the square of mean radius $r_m$, fluid density $\rho$ and the flow rate $Q_2$.

Let us consider the case of a turbine meter with a time constant $\tau = I/r_m^2 \rho Q$ used to measure a highly fluctuating flow having a wave form close to a square wave as shown by the solid curve in FIGURE 26. The average flow rate is $\overline{Q}$; the amplitude of the wave, $a$; and the period of the wave, $\tau_f$. From the above analysis, the turbine meter will respond according to an exponential curve as indicated by the dotted curve in FIGURE 26. It can be shown analytically that the turbine meter will overrun and the transient error in percentage is given by the following equation:

$$\epsilon_t \approx 2\left[1 - \frac{1}{e^{\frac{1}{2}\left(\frac{\tau_f}{\tau}\right)}}\left(\frac{\tau}{\tau_f}\right)\left[\frac{\left(\frac{a}{\overline{Q}}\right)^2}{1-\left(\frac{a}{\overline{Q}}\right)^2}\right]\right] \times 100 \quad (25)$$

FIGURE 25 is a plot of the above equation. It is noted that the transient error of a turbine meter depends upon the nature of the fluctuating flow itself as well as the meter. For a given turbine meter, the transient error increases with the percentage fluctuation $$\left(\frac{a}{\overline{Q}}\right)$$

and frequency $$\left(=\frac{1}{\tau_f}\right)$$

of the flow. For a given fluctuating flow, the transient error is approximately proportional to the time constant $\tau$ of the meter. A turbine meter for accurate measurement of pulsating flow must therefore have a very low time constant $\tau=(I/r_m^2 \rho Q)$ in order that the transient error will be small even for a fluctuating flow of high frequency and large amplitude. The following conclusion can then be made based upon the above analysis:

(1) The moment of inertia of the rotor assembly should be made as low as permitted by strength, rigidity and functional relations of the various parts of the rotor assembly.

(2) With a given moment of inertia of the rotor assembly, the mean radius $r_m$ of the rotor should be made as large as practical without violating other requirements such as low head loss, moderate rotor speed, etc.

(3) The transient response of the turbine meter is considerably more critical in gases than in liquids since the time constant is inversely proportional to the fluid density.

IMPORTANT STRUCTURAL CHARACTERISTICS OF THE TURBINE METER OF THE PRESENT INVENTION

Based on the preceding theory of the turbine meter supplemented with actual experience and test results of several turbine meters designed according to the theory (and tested in air, natural gas, water, gasoline, stoddards solvent, thin oil and thick oil), some important design criteria and the resulting structural features of the turbine meter as disclosed in this application will be discussed briefly as follows:

(1) Turbulent seal

In the preceding analysis, a uniform velocity distribution across the annular cross-section is assumed and the effect of induced drag due to finite blade length is taken as being negligibly small. The conventional means of satisfying this requrement is to keep the blade tip clearance less than 2% of the blade length. This small clearance not only demands close manufacturing tolerances, but also presents a source of potential trouble from entrained particles in the fluid. However, the above-mentioned assumptions can also be satisfied by the use of a novel device referred to as a "turbulent seal."

The straight flow passage 60 (FIGURES 4 and 5) of the turbine meter has a properly proportioned recess 107 (for stability of flow) into which the rotor blades 100 protrude, or are at least flush with the recess (i.e., blade tip diameter $D_t \cong D_o$ the turbine housing diameter) with ample clearances as shown in FIGURE 5. The axial length of recess 107 is preferably substantially equal to an even whole number multiple of the radial depth thereof.

Due to its inertia, the fluid passes through the straight flow passage 60 without deviating into the recess 107. The stability of this flow pattern is greatly strengthened by the centrifugal effect of the rotation of the fluid inside the recess 107 induced by the rotation of the blades 100. This novel device, referred to as a "turbulent seal," eliminates completely the leakage effect of clearance between the tips of the rotor blades 100 and turbine housing 22, 26, 32 and 28, for flows even below $Q_{min}$. Its unusually large physical clearance eliminates any potential trouble due to entrained particles in the flow as well as eliminating close manufacturing tolerances thereby resulting in lower cost. The breaking or retarding torque induced in the turbulent seal, and exerted on the turbine rotor bears the same functional relation to flow as the driving torque [i.e., it just increases the value of $C_t$ in Equation 13], resulting in a lowering of the registration curve of the meter by a constant amount throughout the entire operating flow range without changing its nature. Since this amount of lowering of the registration curve is the same for all fluids, it can be once and for all corrected by direct calibration of the meter register. Endurance tests also indicate that the recess is kept clean by the sweeping action of the turbine blades.

(2) Magnetic suspension of turbine rotor assembly

From the discussions of Equations 9, 14, and 13, it is concluded that the performance of the turbine meter at the lower end of its operating flow range is governed primarily by the magnitude of the mechanical friction $T_m$ present in the meter. This effect of mechanical friction is especially critical for turbine meters used for measurement of fluids of low density such as gases, since the slip of the rotor to overcome a given mechanical friction is inversely proportional to the fluid density [Equation 12]. For a turbine gas meter, the bearing friction due to the weight of the rotor assembly constitutes an important part of the mechanical friction $T_m$ and must be kept to a minimum consistent with the mechanical strength and rigidity of the rotor assembly and good manufacturing practice. However, the effect on mechanical friction of the weight of the rotor assembly can be almost completely eliminated by a very simple, but effective device referred to as the "magnetic suspension" of the turbine rotor assembly.

The weight of the rotor assembly is practically balanced by the magnetic attractive force exerted on the rotor shaft by a suitable permanent magnet properly positioned (such as a horseshoe-shaped permanent magnet 96 in FIGURE 2). The permanent magnet is initially slightly demagnetized so that its residual magnetization will remain constant indefinitely after installation in the meter. The position of the magnet is such that the resultant magnetic attraction has approximately the same line of action as the resultant gravity force of the rotor assembly. There should be sufficient gap between the magnet 96 and the rotor shaft 90 so that any allowable radial play of the rotor shaft 90 within its radial bearings 92 and 94 does not change appreciably the magnitude of the magnetic force. Therefore, the main function of the radial bearings is to define the radial position of the rotor. Since the rotor is statically and dynamically balanced and the weight of the rotor assembly is taken by the magnetic suspension, these bearings 92 and 94 carry very little load, resulting in long bearing life and very low bearing friction. This low bearing friction gives much better meter performance (especially at low flow rates) and a much wider flow range.

(3) Magnetic drive to the sealed register

One of the most important problems that existed in direct registering flow meter was the provision of a suitable coupling between the metering element and an external register, while maintaining a fluid tight seal. Conventional dynamic seals such as a stuffing box or an ordinary magnetic coupling might work satisfactorily for positive displacement type flow meters. However, these seals cannot be tolerated by high accuracy turbine meters mainly because of their excessive mechanical friction imposed on the rotor assembly. A new type of magnetic drive referred to as the "double repulsion" type (one form of this type is shown in FIGURE 13) has been developed and works very satisfactorily with turbine gas meters such as the one shown in FIGURE 2. It introduces practically no mechanical friction, has very low moment of inertia, high pick-up speed and reasonably high transmission torque. In the case of the turbine liquid meter (FIGURE 15) which can tolerate some small mechanical friction, a "double attraction" type magnetic drive is most suitable because of its higher transmission torque and higher pick-up speed. The detailed description of these new types of magnetic drives is disclosed in our said copending patent application Serial Number 634,662.

(4) Diameter ratio

Except in some special cases, the diameter of the turbine housing is made equal to the diameter of the pipe into which the turbine meter is inserted for flow measurement. This design has the following advantages:
  (i) Permits "in-the-line" installation,
  (ii) Results in minimum change in flow direction,
  (iii) Allows compact design.

The ratio of the core diameter to the turbine housing diameter $D_i/D_0$ (FIGURE 19 or 20) is directly related to the head loss, starting flow, blade design and rotor speed. Low head loss requires large flow area, therefore low $D_i/D_0$ ratio [Equation 22] whereas low starting flow demands high inlet velocity, therefore large $D_i/D_0$ ratio [Equation 9]. If straight blades are to be used for the sake of low manufacturing cost as in FIGURE 4, the $D_i/D_0$ ratio should not be less than 0.75 in order to maintain reasonably good blade efficiency throughout the entire length of the blade. For a given flow rate and a given blade angle, the rotor speed is directly determined by the $D_i/D_0$ ratio. The value of the $D_i/D_0$ ratio should be such that it gives an optimum operating range of rotor speeds with regard to sensitivity, resolution and life of the turbine meter. Therefore, the proper value of the $D_i/D_0$ ratio of the turbine meter must be a compromise of the requirements discussed above.

Analysis and experimental results indicate that the optimum values of the diameter ratio of the turbine meter are $$\left.\begin{array}{l}.60<\dfrac{D_i}{D_0}<0.75 \text{ for liquid} \\ .70<\dfrac{D_i}{D_0}<0.85 \text{ for gases}\end{array}\right\} \quad (26)$$

For values of $$\dfrac{D_i}{D_0}>0.75,$$

straight blades can be used with little loss in overall blade efficiency (to be discussed more in detail later).

(5) Core design

The design of the core 38, 40, of a turbine meter (FIGURE 2) is based on the following three requirements:
  (i) Providing a flow passage which gives as close to uniformly distributed purely axial inlet velocity as possible.
  (ii) Low venturi loss.
  (iii) Minimum length consistent with (i) and (ii).

The generally desirable shape of the core is shown by the one in FIGURE 2. Starting from the upstream end, the core has a comparatively blunt nose followed by a long straight portion leading to the rotor blades 100. Downstream from the blades 100, it has a short straight portion followed by a tail piece, which tapers first gradually and then more sharply. The profile of the core is such that the rate of change of both the magnitude and the direction of the flow velocity is continuous and moderate. The venturi loss coefficient $C_v$ defined in Equation 21 for the core shown in FIGURE 2 is found to be less than 0.5 by actual test.

(6) Blade cross-section

Following the discussion of Equations 9 and 13, it is evident that the airfoil blades will give better performance than the flat plate blades, particularly at low flow rates. The former has a larger stalling angle, higher lift and lower drag for a given angle of attack, resulting in a larger driving torque for a given slip of the rotor and a smaller value of the turbulent coefficient $K_t$ and thus a lower value of starting flow [Equation 9]. Also, within a small range of angle of attack, both the absolute magnitude and the amount of variation of the drag coefficient [which determines primarily the value of turbulent coefficient $C_t$ in Equation 13] are appreciably smaller when airfoil sections are used rather than flat plates, resulting in a better linear relation between turbine speed and flow rate over a wider range of flow. Another advantage of airfoil sections lies in the fact that they permit the desired mechanical strength and rigidity with a minimum sacrifice of blade efficiency. However, for applications where extremely high accuracy and wide flow range are not needed and where low cost is essential, flat plate blades will prove to be satisfactory since at moderate and high flow rates, the angle of attack is usually very small and essentially constant [Equation 17].

(7) Blade curvature

The blade curvature can be expressed as $\beta_2-\beta_1$, the difference in blade outlet and inlet angles (FIGURE 21). The angles are taken from the mean camber line. Theory and actual test results indicate that the angle of attack for symmetrical blades is less than 2° within the entire operating flow range (Equation 17). Therefore, no blade curvature is necessary, i.e., $$\beta_2=\beta_1=\beta \quad (27)$$

Besides, symmetric blades are very desirable from the point of view of manufacturing and cost. Moreover, improper blade curvature will impair rather than improve the meter performance.

(8) Blade thickness

Low weight and low moment of inertia of the rotor requires thin blades. Also, test results show that the blade thickness has no appreciable effect on the hydrodynamic properties of the blades within the operating flow range of the meter. Therefore, the blade thickness should be kept to a minimum consistent with the blade mechanical strength, rigidity and good manufacturing practice. For turbine gas meter where the weight and moment of inertia of the rotor are most critical [see discussion under Equations 9, 13 and 25] hollow blades might be justified in some applications.

(9) Blade angle

For given flow condition, there is an optimum blade setting to give maximum blade efficiency. However, for a turbine meter with symmetrical airfoil blades working within its operating flow range, the efficiency remains good within ±10° from its optimum blade setting. However, high driving torque requires large blade angle [Equations 5 and 10] whereas low head loss demands low blade angle [Equation 22]. The desirable range of blade angle $\beta=\beta_1=\beta_2$ measured from the axial direction is therefore a compromise among the above-mentioned factors together with the desirable value of the maximum rotor speed and is found experimentally as follows:

$$40°<\beta<60° \quad (28)$$

The blade angle should be slightly higher for fluids of low density, such as gases, than for fluids of high density, such as liquids.

(10) Solidity

It has been emphatically mentioned in the previous analysis [Discussion under Equations 5a and 13] that the blades of a high accuracy turbine meter should be sufficiently close so that the deviation between the fluid outlet angle $\alpha_2$ and the blade outlet angle $\beta_2$ is negligibly small and thus $\alpha_2\approx\beta_2=$constant throughout the entire operating range. Closely spaced blading requires high solidity $$\delta=\dfrac{C}{S}$$

the ratio of blade chord to blade spacing (FIGURE 21). However, high solidity means large total blade area, resulting in high blade profile friction. Therefore, the proper value of solidity should be low enough to insure low blade friction loss but high enough that the fluid is closely guided by the blading through an angle practically identical with that of the blading itself. Fortunately, the actual deflection of the fluid caused by the blading is very small [angle $\delta < 6.9°$ Equation (19)] and only moderate value of solidity is needed to obtain the condition that $\alpha_2 \approx \beta_2$.

Experimental results indicate that the following range of solidity proved to be desirable:

$$1.1 < \delta < 1.5 \qquad (29)$$

The solidity should be slightly higher for compressible fluids, such as gases, than for incompressible fluids, such as liquids.

At any radius $r$ of a rotor with $Z$ blades, the blade spacing or pitch is $$S = \frac{2\pi r}{Z}$$

The corresponding value of solidity is thus $$\delta = \frac{C}{S} = \frac{Z}{2\pi} \frac{C}{r} \qquad (30)$$

where $C$ is the chord length of the blade at radius $r$. It is noted from the above equation that the solidity of the blading system at radius $r$ is inversely proportional to the radius $r$. Therefore, to maintain the same value of solidity throughout the entire blade length as the designed value $$\delta_m = \frac{Z}{2\pi} \frac{C_m}{r_m}$$

at mean radius $r_m$, the chord length $c$ of the blade must increase linearly with radius $r$ so that $$\frac{C}{r} = \frac{C_m}{r_m}$$

However, for properly twisted blades to be discussed later, the blade angle $\beta$ increases with increase of radius. A lower value of solidity of a blade system with larger blade angle has the same effect in guiding the flow as a blade system with high solidity, but smaller blade angle. Therefore, for twisted blades, the solidity is preferred to decrease slightly at uniform rate from the blade root, say, $\delta = 1.5$, to blade tip, say, $\delta = 1.2$, to obtain minimum blade friction. However, the chord length of the blade of a turbine meter should always be largest at tip and smallest at root, just to the contrary of the proper blade form of power turbines. The smaller chord at blade tip and larger chord at blade root of blades of power turbines is determined on the basis of stress standpoint.

(11) *Number of blades*

For a given value of solidity, test results show higher blade efficiency the fewer the blades. On the other hand, more blades result in a more uniform distribution in velocity, pressure and torque application. Also, for a given solidity, large number of blades results in a rotor with shorter axial length, less weight and smaller moment of inertia. Therefore, the optimum value of the number of rotor blades is a compromise of the above discussed factors.

Experiment tests indicate that the desirable range of number of blades $Z$ is $$12 \leq Z \leq 24 \qquad (31)$$

The number of blades should be slightly larger for compressible fluids, such as gases, than for incompressible fluids, such as liquids.

(12) *Blade twist (see Figures 15 to 18)*

The blade is first designed at mean radius $r_m$ of the rotor. Based on the assumption that the inlet velocity to the blade $\iota_a$ approaches a uniform distribution across the cross section (1) FIGURE 19, the blades are best to be so twisted at other radii that the same angle of attack along the entire length of the blades is maintained. This means that the designed condition of maximum blade efficiency (Lift/Drag ratio), minimum magnitude and minimum possible variation of turbulent coefficient [$C_t$ Equation 13] is maintained along the entire length of the blades resulting in maximum overall driving torque per unit slip of the rotor, minimum overall fluid friction and best possible linear relation between the rotor speed and flow rate. The functional relationship between the amount of blade twist and the distance from the rotor axis is as follows:

From Equation 17 at mean radius $r_m$ of the rotor and FIGURE 22

$$m_\iota = m_{\beta 1} - m_{\alpha 1} - m_\beta - m_{\alpha 1}$$

or $$m_\beta = m_\iota + m_{\alpha 1} = m_\iota + \tan^{-1} \frac{r_{m\omega}}{\nu_a} \qquad (32)$$

At any radius $r$ $$r_\beta = r_\iota + \tan^{-1}\left(\frac{r_\omega}{\nu_a}\right) \qquad (32a)$$

When the blade is so twisted that the angle of attack is the same along the entire blade length and equal to $m_\iota$, Equation 32a becomes $$r_\beta = m_\iota + \tan^{-1}\left(\frac{r_\omega}{\nu_a}\right) \qquad (33)$$

The amount of blade twist at any radius $r$ with respect to the blade angle at mean radium $r_m$ is thus equal to $$r_\beta - m_\beta = \tan^{-1}\left(\frac{r_\omega}{\nu_a}\right) - \tan^{-1}\left(\frac{r m_\omega}{\nu_a}\right) \qquad (34)$$

and the total angle of blade twist from the blade root to blade tip is given by $$t_\beta - r_\beta = \tan^{-1}\left(\frac{r_{t\omega}}{\nu_a}\right) - \tan^{-1}\left(\frac{r_{r\omega}}{a}\right) \qquad (35)$$

It is noted from Equation 33 that the blade angle increases with the radius $r$, minimum at blade root and maximum at blade tip. However, within the above-mentioned desirable range of the diameter ratio of the turbine meter [Equation 26], the maximum amount of blade twist referring to the designed value of blade angle at mean radius is less than $\pm 8°$. It has been discussed previously under the heading of "Blade Angle" that the blade angle is not critical and the blade efficiency remains good within $\pm 10°$ from its optimum blade setting. Therefore, the slight variation in blade angle as a result of twisting blade according to the requirement of the same angle of attack along the entire length of the blades creates no significant objection For a turbine meter with diameter ratio $$\frac{D_\iota}{D_0} > 0.75$$

untwisted blades will only cause a variation of angle of attack less than $\pm 4°$ from blade root to blade tip resulting in only slight effect on meter performance especially with airfoil blades. Therefore, for turbine meters where extreme high accuracy is not required but low cost is essential, especially for small size of meters, straight untwisted blades will prove to be satisfactory in most cases (see FIGURES 10 to 12).

FIGURE 15 shows one of the desired forms of the turbine rotor with its blading in compliance with the specifications given above for those turbine meters where extremely high accuracy is essential, while weight and moment of inertia of the rotor and the manufacturing cost are not critical such as in the case turbine liquid meter of medium or large size. On the other hand, when the weight and the moment of inertia of the rotor, as well as the manufacturing cost are critical while the accuracy requirement is only moderate (say within $\pm 0.5\%$ over a flow range of 10), such as in the case of turbine gas meter, the form of turbine rotor shown in FIGURES 1 to 12 is more desirable. Straight blades are satisfactory in this case when $$\frac{D_r}{D_t} > 0.85$$

From the foregoing analysis, the following important conclusion on the turbine meter designed according to the criteria listed above has been established.

It the mechanical friction $T_m$ is made small enough that the slip of the rtor due ot $T_m$ becomes insignificant at minimum flow of the operating flow range in fluids of not high viscosity, Equation 13 is then reduced to $$\frac{\omega}{Q} = \frac{1}{r_m A_a} \left[ (\tan m_{\beta 2}) - \left( \frac{A_a}{2r_m^2} C_t \right) \right] \quad (36)$$

When the turbine meter is so designed that the turbulent coefficient $C_t$ remain a constant; the accuracy curve becomes a single flat curve within its operating range. The meter will have the same calibration constant for all fluids having different densities and viscosities as long as the mechanical friction and the viscous drag being small enough that the rotor slips due to them are insignificant.

With the turbine operating as a flow measuring device, it will handle large volume with low differential pressure. Analysis reveals that the axial flow type turbine is more suitable than the radial flow or mixed flow type in this particular application. In view of the above consideration, only an axial flow type turbine meter will be analyzed in detail although the analysis can be extended to other types without much modification.

The less the flow is disturbed, the lower the flow loss will be, and the more accurate the turbine meter can be made. The direction of the inlet flow is thus preferred to be purely axial in the axial flow type turbine meter since the flow reaching the turbine meter is substantially axial in direction. Proper straightening vanes are needed ahead of the turbine rotor to assure axial flow for accurate measurement if the turbine meter is to be placed imediately behind a double elbow or other similar arrangement which causes a pre-rotation of considerable magnitude.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a fluid flow meter, a separable two-part tubular housing having axially opposed abutting surfaces and oppositely facing ends provided with means adapted to establish a connection to a fluid pipeline, a pair of axially spaced apart, aligned cores coaxially mounted in said housing and defining with the inner wall of said housing a longitudinal fluid flow channel of annular cross section, at least the upstream one of said cores being faired for gradually transposing the cross-sectional configuration of the oncoming fluid stream, means independently fixing said cores to respective ones of the housing parts, a rotatable, peripherally bladed metering rotor disposed axially between said cores and having its blades in the path of fluid flowing through said channel to be driven by fluid flow therethrough, the downstream one of said cores cooperating with said housing to extend said channel a predetermined axial distance downstream of said rotor, said housing parts abutting each other along an interface contained in a plane passing radially through said rotor, a support detachably mounted on one of said cores, and means journalling said rotor only on said support in an overhanging position whereby said two-part housing can be separated to provide access to said rotor while maintaining the support therefor.

2. The fluid flow meter according to claim 1 characterized in that the ratio of the rotor blade chord length to blade spacing is in the order of 1.1 to 1.5 at the mean radius of the blades and within such range from the roots to the tips of the blades.

3. A fluid flow meter according to claim 1 characterized in that the rotor blade chord length is larger at the rotor blade tips than at the rotor blade roots and that the number of the blades on the rotor is in the order of 12 to 24.

4. A fluid flow meter according to claim 1 characterized in that the blades of said rotor are so formed that the angle of attack of the fluid relative to the blades is substantially uniform from the root to the tip of the leading edge of the blades.

5. A fluid flow meter according to claim 1 characterized in that the ratio of the rotor blade chord length to blade chord spacing is in the order of 1.5 at the roots of the blades and in the order of 1.2 at the tips of the blades.

6. A fluid flow meter according to claim 1 characterized in that the blades of the rotor are of lightweight thin air foil construction and have a blade angle between 40° and 60° with respect to the rotor rotation axis.

7. A fluid flow meter according to claim 1 characterized in that the ratio of the diameter of the inner boundary of said channel to the diameter of the outer boundary thereof is in the order of 0.60 to 0.85.

8. A fluid flow meter according to claim 1 characterized in that the blades of the rotor are straight in cylindrical cross section and the ratio of the diameter of the inner boundary of the channel to the diameter of the outer boundary thereof is at least equal to 0.75.

9. A fluid flow meter according to claim 7 characterized in that in the case of media of low inner friction, particularly gas, said diameter ratio is in the range of 0.6 to 0.75.

10. A fluid flow meter according to claim 7 characterized in that in the case of media of high inner friction said diameter ratio is in the range of 0.70 to 0.85.

11. The fluid flow meter defined in claim 1 wherein said rotor comprises a hub having an appreciably smaller diameter than said cores and a plurality of spokes supporting said blades and extending radially from said hub substantially to the inner diameter of said flow channel.

12. A fluid flowmeter comprising a housing, a rotatable rotor assembly disposed in said housing and having a shaft and a peripherally bladed rotor carried by said shaft, means including a core structure for directing motive fluid into said rotor in an annular stream parallel to the rotational axis of said rotor assembly for imparting drive torque to said rotor, means comprising axially spaced apart bearings supported by said core structure and journalling said shaft, said shaft having at least a portion thereof formed from magnetic material and extending generally horizontally in the normal operative position of said meter, a magnet supported by said core structure in radially spaced relation above said magnetic portion of said shaft for applying a resultant magnetic attractive force passing axially between said bearings and radially of said shaft to counterbalance the gravitational forces acting on said rotor assembly.

References Cited by the Examiner

UNITED STATES PATENTS

| | | | |
|---|---|---|---|
| 789,110 | 5/05 | Warren | 73—231 |
| 1,967,449 | 7/34 | Ostman | 73—231 |
| 2,346,864 | 4/44 | Packard | 73—229 |
| 2,449,973 | 9/48 | Bergman | 73—257 |
| 2,728,893 | 12/55 | Bartelink | 73—231 X |
| 2,882,727 | 4/59 | Newbold | 73—231 |
| 2,974,525 | 3/61 | Cole | 73—231 |

RICHARD C. QUEISSER, *Primary Examiner.*

ROBERT L. EVANS, *Examiner.*

UNITED STATES PATENT OFFICE
CERTIFICATE OF CORRECTION

Patent No. 3,210,997                                        October 12, 1965

Henning Karlby et al.

It is hereby certified that error appears in the above numbered patent requiring correction and that the said Letters Patent should read as corrected below.

Column 14, line 47, equation 19 should appear as shown below instead of as in the patent:

$$m_\delta < 6.9°$$

column 23, line 4, for "It" read -- If --; line 5, for "rtor due ot" read -- rotor due to --.

Signed and sealed this 6th day of December 1966.

(SEAL)
Attest:

ERNEST W. SWIDER                                            EDWARD J. BRENNER
Attesting Officer                                                Commissioner of Patents